United States Patent
Wu et al.

(10) Patent No.: US 8,514,189 B2
(45) Date of Patent: Aug. 20, 2013

(54) TOUCH DETECTING DEVICE AND METHOD THEREOF

(75) Inventors: Hung-Wei Wu, Tai Pei County (TW); Chih-Yu Chang, Hsin Chu (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 704 days.

(21) Appl. No.: 12/749,748

(22) Filed: Mar. 30, 2010

(65) Prior Publication Data
US 2011/0031042 A1    Feb. 10, 2011

(30) Foreign Application Priority Data
Aug. 5, 2009 (TW) ................................ 98126309 A

(51) Int. Cl.
G06F 3/041 (2006.01)
G06F 3/033 (2013.01)
G06F 3/044 (2006.01)
G09G 5/00 (2006.01)
G08C 21/00 (2006.01)

(52) U.S. Cl.
USPC ......... 345/173; 345/156; 345/184; 178/18.06

(58) Field of Classification Search
USPC ........................................................ 345/173
See application file for complete search history.

(56) References Cited

U.S. PATENT DOCUMENTS

| | | | | |
|---|---|---|---|---|
| 4,922,061 A | * | 5/1990 | Meadows et al. | 347/175 |
| 5,914,708 A | * | 6/1999 | LaGrange et al. | 345/179 |
| 2007/0262966 A1 | * | 11/2007 | Nishimura et al. | 345/173 |

\* cited by examiner

*Primary Examiner* — Charles V Hicks
(74) *Attorney, Agent, or Firm* — Muncy, Geissler, Olds & Lowe, PLLC

(57) ABSTRACT

A touch detecting device comprises at least one driving circuit, a plurality of conductive lines and at least one sensing circuit. The originally available conductive lines of a touch panel are used to detect a finger touch by means of detecting a current leakage through the finger to the ground. Thus, the invention can reduce the hardware cost, avoid noise interference and correctly respond to a finger touch.

33 Claims, 25 Drawing Sheets

TOUCH DETECTING DEVICE AND METHOD THEREOF

This application claims the benefit of the filing date of Taiwan Application Ser. No. 098126309, filed on Aug. 5, 2009, the content of which is incorporated herein by reference.

BACKGROUND OF THE INVENTION

1. Field of the Invention

The invention relates to touch panels, more particularly, to a touch detecting device for touch panels.

2. Description of the Related Art

FIG. 1A shows a schematic diagram of a conventional sensor array. Referring to FIG. 1A, a conventional touch panel uses a sensor array 100 to detect a location and a pressure of either a user's finger or a stylus. The sensor array 100 includes two layers of conductors. A first group of long strips of conductors on x-axis is arranged orthogonally to a second group of long strips of conductors on y-axis. Depending on the touch panel being capacitive or resistive, a corresponding sensing element, e.g., a resistor or a capacitor, is installed at each intersection of two strips of conductors as shown in FIGS. 1B and 1C. If the finger or the stylus touches the sensor array 100 at a certain position, its corresponding capacitance or resistance will change. Assuming that one specific row of the sensor array 100 is enabled, after an input signal is applied to the specific row, six output signal values (0, 1, 2, 3, 4, 3) are respectively measured at six different nodes of the specific row, thus indicating different touch pressure. In this case, the fifth node has a relatively high pressure. If each row and column of the sensor array 100 is sequentially or simultaneously measured, a two-dimensional map of touch pressures on the sensor array 100 will be obtained, indicating the pressure magnitudes and the positions of multiple finger touches. However, the above sensor array 100 needs additional capacitor or resistor manufacturing process and thus the hardware cost is increased.

On the other hand, the sensor array 100 is subject to noise interference, so it is difficult for the system to distinguish the finger touch from noise interference if there are variations of resistance or capacitance. For example, with respect to a capacitor having a capacitance of 50 pF, a variation of capacitance caused by the finger touch is about 1 pF. When the capacitor is charged to a voltage level of 2V, a variation of resistance caused by the finger touch is about 40 mV while the voltage level of noise interference is about several tens of mV. Accordingly, its corresponding signal-to-noise (SNR) value is not large enough, so it is easy to cause the system to misjudge.

In particular, most of current touch panels are manipulated in a complicated manner and loaded with several wireless communication functions (e.g., infrared or Bluetooth connectivity) or a backlight plate. Accordingly, noise sources of a touch panel are various, including 1/f noise, white Gaussian white noise, power noise, 50/60 Hz noise, communication microwave noise and backlight noise. Reference is now made to FIG. 2, which is a schematic diagram illustrating a common noise distribution in frequency domain. In general, lowpass filters are configured to filter out high frequency noise. With respect to low frequency noise (e.g., 1/f noise and 50/60 Hz noise), when a lowpass filter in use is designed to have operate at a lower cutoff frequency, lower frequency noise can be eliminated, yet its response time is also increased as well. For example, assuming that a lowpass filter in use is designed to operate at a cutoff frequency of 10 Hz to eliminate 60 Hz noise, its response time will be delayed by 0.1 second, equivalent to 0.1 second delay in drawing lines. When there are delays between finger touches and the responses of applications, it will cause inconvenience for users.

SUMMARY OF THE INVENTION

One objective of the invention is to provide a touch detecting device to solve the above mentioned problems.

To achieve the above-mentioned object, the touch detecting device for a touch panel, comprising: at least one driving unit, each generating at least one driving signal according to a specified sequence; a sensing array, the sensing array comprising a plurality of conductive lines, each receiving one of the at least one driving signal and generating an output signal, wherein the plurality of conductive lines are arranged to form a specified two-dimension coordinate system; and, at least one sensing circuit, each receiving at least one of the output signals and performing signal extraction operations to generate a measuring value; wherein the amplitude of the output signal and the magnitude of the measuring value are related to whether a user touch is present on the sensing array; and, wherein each of at least one touched conductive line permits a leakage current flowing from at least one of the plurality of conductive lines through the user's body to ground when the user touch is present on the sensing array.

Another object of the invention is to provide a touch detecting device for a touch panel, comprising: a wave generator for generating in parallel a plurality of wave signals according to a specified frequency; a sensing array, the sensing array comprising a plurality of conductive lines, wherein the plurality of conductive lines are arranged to form a specified two-dimension coordinate system and the plurality of conductive lines receive in parallel the plurality of wave signals to generate a plurality of modulated signals; a demodulation unit for receiving in parallel the plurality of modulated signals and performing demodulation according to their corresponding wave signals to generate a plurality of touch signals; and, a calculating unit for receiving in parallel the plurality of touch signals and generating a plurality of measuring values; wherein the amplitudes of the plurality of modulated signals, the amplitudes of the plurality of touch signals and the magnitudes of the plurality of measuring values are related to whether a user touch is present on the sensing array; and, wherein each of at least one touched conductive line permits a leakage current flowing from at least one of the plurality of conductive lines through the user's body to ground when the user touch is present on the sensing array.

Another object of the invention is to provide a touch detecting method for a touch panel, comprising: according to a specified frequency, generating in parallel a plurality of driving signals; providing a sensing array, the sensing array comprising a plurality of conductive lines, wherein the plurality of conductive lines are arranged to form a specified two-dimension coordinate system and the plurality of conductive lines receive in parallel the plurality of driving signals to generate a plurality of output signals; and, according to their corresponding driving signals, performing signal demodulation operations on the plurality of output signals in parallel to obtain a plurality measuring values; wherein the amplitudes of the output signals and the magnitudes of the measuring values are related to whether a user touch is present on the sensing array; and, wherein each of at least one touched conductive line permits a leakage current flowing from at least one of the plurality of conductive lines through the user's body to ground when the user touch is present on the sensing array.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1B:
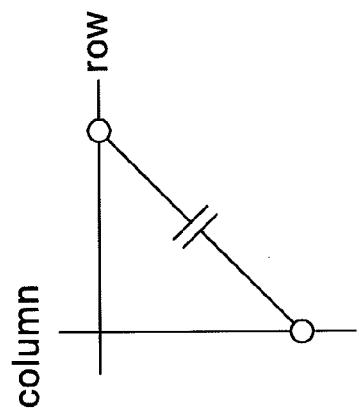
FIG. 1B is an enlarged diagram showing a resistor installed at an intersection of two strips of conductors according to the sensor array in FIG. 1A.
Figure 1C:
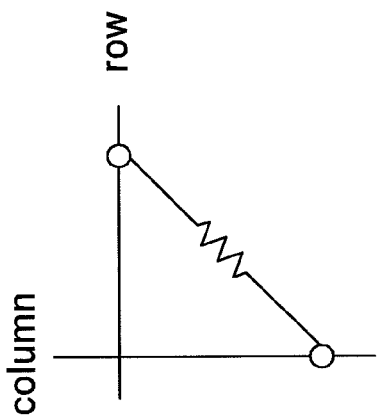
FIG. 1C is an enlarged diagram showing a capacitor installed at an intersection of two strips of conductors according to the sensor array in FIG. 1A.
Figure 1A:
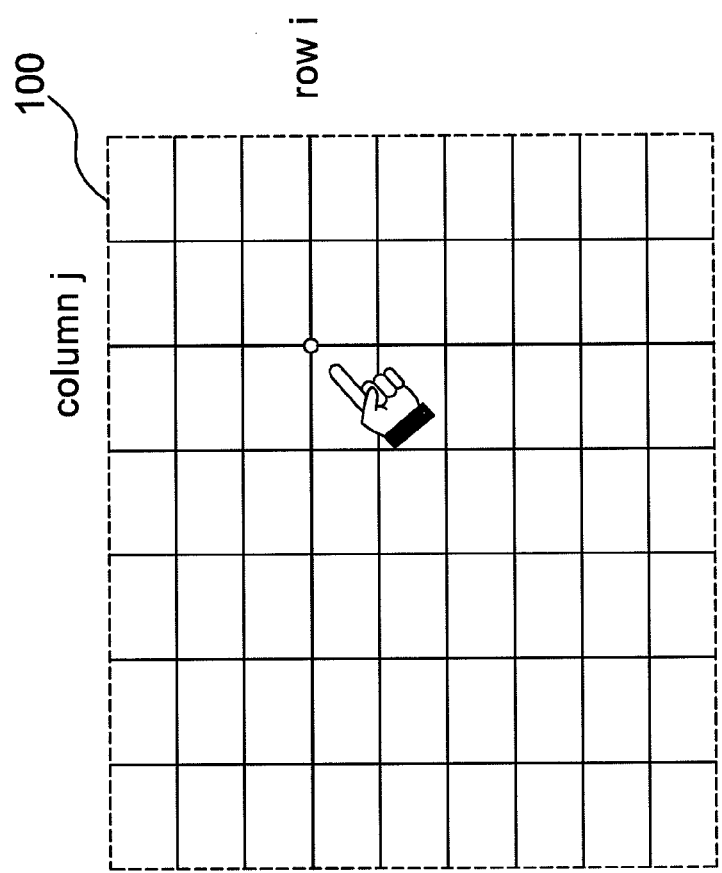
FIG. 1A shows a schematic diagram of a conventional sensor array.
Figure 2:
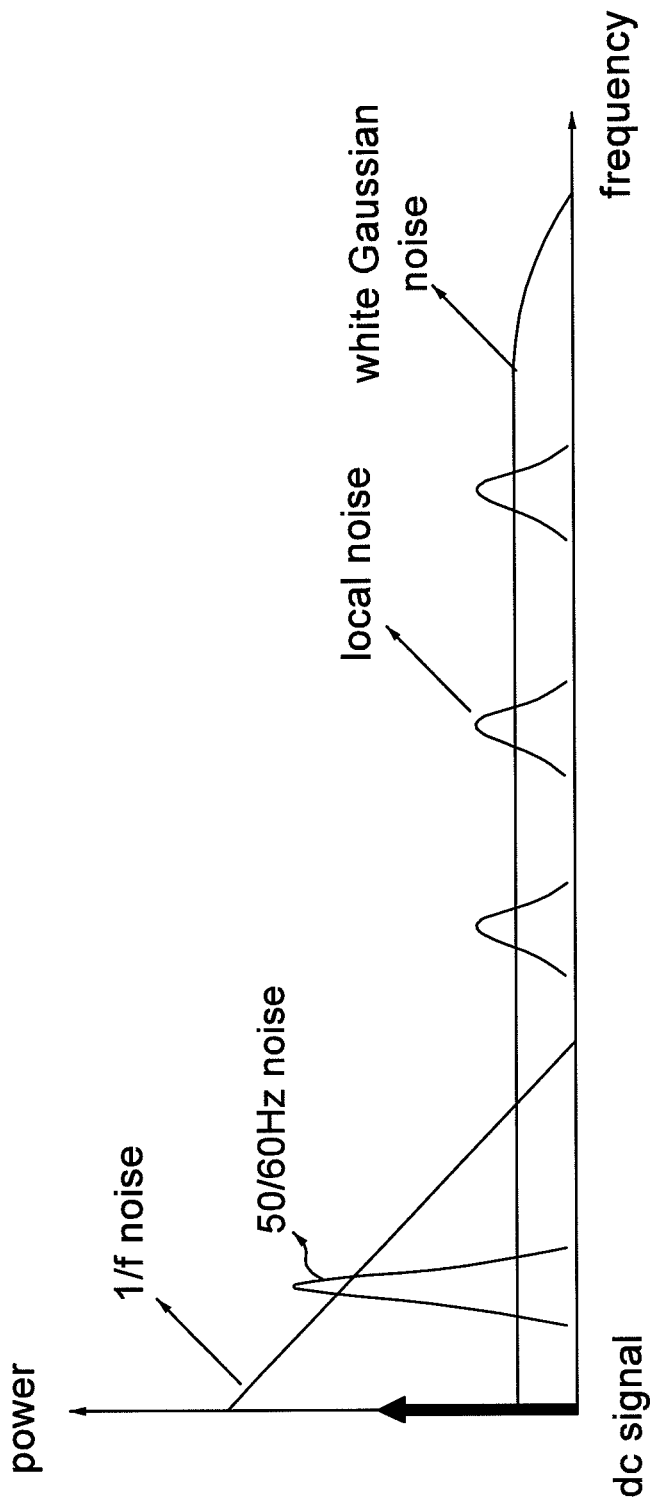
FIG. 2 is a schematic diagram illustrating a common noise distribution in frequency domain.

A feature of the invention is that signal orthogonality, modulation and demodulation are used to reduce noise interference, thereby increasing signal quality effectively and responding to a user touch correctly. The technical background and the reason for using signal orthogonality and how to reduce noise interference will be hereinafter described.

Assuming that a set of vectors Vi (i=0, 1, . . . , n, where n is a natural number) is said to be orthogonal if the dot product of two different vectors Vi and Vj is equal to zero (i.e., Vi*Vj=0, where i≠j and the notation*denotes the dot product) and the dot product of two same vectors Vi and Vj is equal to one (i.e., Vi*Vj=1, where i=j). For example, two vectors V1=(0, 0, 0, 1) and V2=(0, 0, 1, 0) are orthogonal since they satisfy the following requirements: V1*V2=0, V1*V1=0 and V2*V2=0. The dot product of two vectors V1=(a1, b1, c1, d1) and V2=(a2, b2, c2, d2) is given by: V1*V2=a1×a2+b1×b2+c1×c2+d1×d2.

Theoretically, any signal Si can be expressed in terms of a set of orthogonal vectors:

$$Si = c1 \times V1 + c2 \times V2 + c3 \times V3 + \ldots + cn \times Vn, \quad (1)$$

where the ci (i=0, 1, 2, . . . , n) is a coefficient of its corresponding vector component Vi.

A known signal Y is firstly modulated with a modulating vector Vi into a modulated signal $S_m$ (=Y*Vi). Then, after the modulated signal $S_m$ is applied to a device and interfered with by ambient noise, an output signal $S_O$ is measured at the output terminal of the device. After the output signal $S_O$ is measured, a recovered signal $S_R$ is obtained according to the original modulating vector Vi. Since noise can be regarded as consisting of another set of orthogonal vectors, the recovered signal $S_R$ will include only the noise along the vector component Vi in addition to the original signal Y. This is equivalent to eliminating the noise of most frequency bands (e.g., low frequency noise, 50/60 Hz noise, 1/f noise). For example, ambient noise Na=100×V1+50×V2+20×V3+10×V4+2×V5+4×V6+ . . . +10×Vn. Provided that the known signal Y is firstly modulated with a modulating vector V5 into a modulated signal $S_m$ (=Y*V5), the modulated signal $S_m$ is then applied to the device and interfered with by ambient noise. The output signal $S_O$ measured at the output terminal of the device is given by $$S_O=S_m+Na=Y*V5+100\times V1+50\times V2+20\times V3+10\times V4+2\times V5+4\times V6+\ldots+10\times Vn.$$

The output signal $S_O$ includes various kinds of noise, so it is hard to distinguish the original signal Y from the output signal $S_O$. According to signal orthogonality, the invention retrieves the coefficient of the modulating vector V5 by using the modulating vector V5 to obtain the recovered signal $S_R=S_O*V5=Y\times1+100\times0+50\times0+20\times0+10\times0+2\times1+4\times0+\ldots+10\times0=Y+2$. The process of retrieving the coefficient of the modulating vector V5 is equivalent to performing signal demodulation. Therefore, compared to noise including various vector components, the recovered signal $S_R$ only includes its original signal Y and a tiny amount of noise, so the use of signal orthogonality can effectively reduce noise interference and increase signal quality. Furthermore, the frequencies selected by general demodulation techniques are sinusoidal waves, equivalent to Fourier Transform. Thus, general demodulation techniques can be regarded as the applications of a set of orthogonal vectors. For example, in equation (1), $V1=\sin(2\pi\times1\times t)$, $V2=\sin(2\pi\times2\times t)$, ..., $Vn=\sin(2\pi\times n\times t)$.

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 3A:
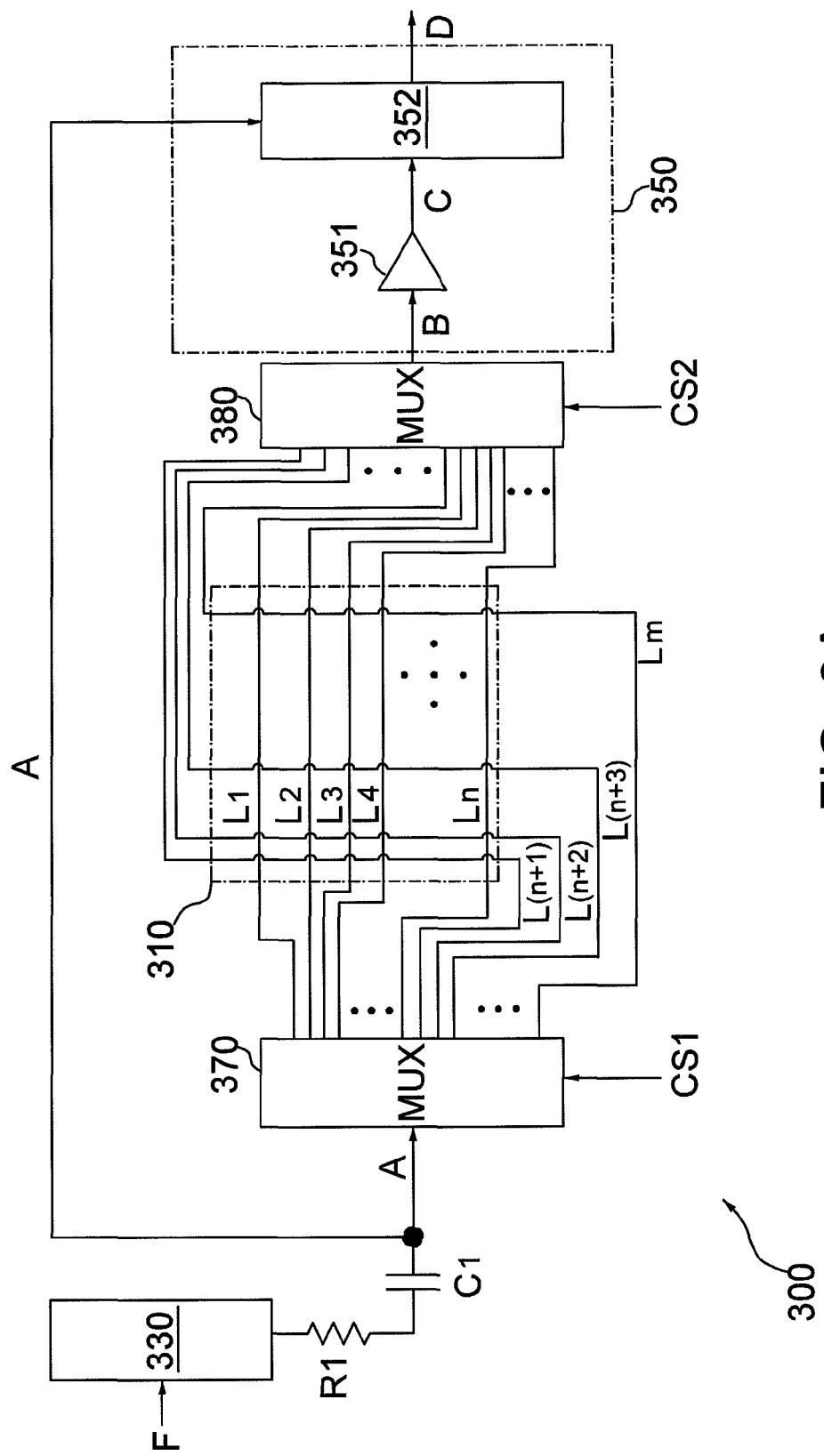
FIG. 3A is a block diagram of a touch detecting device according to a first embodiment of the invention.

FIG. 3A is a block diagram of a touch detecting device according to a first embodiment of the invention. Referring to FIG. 3A, a touch detecting device 300 of the invention, for use in a touch panel (not shown), includes a conductive line array 310, a driving unit 330, a sensing circuit 350 and two multiplexers 370, 380. In addition, the sensing circuit 350 includes a buffer 351 and a signal extracting unit 352.

In this embodiment, the conductive line array 310 is formed by a first group of conductive lines $L_1$-$L_n$ on x-axis and a second group of conductive lines $L_{(n+1)}$-$L_m$ on y-axis that are originally available in the touch panel and arranged in a rectangle pattern (i.e., forming a Cartesian coordinate system), where parameters m and n are positive integers. According to the invention, the originally existing conductive lines of the touch panel are used to detect a capacitive object's touch by means of detecting a current leakage through the capacitive object to the ground. For example, a finger touch or a stylus held in a user's hand can be detected by means of detecting a current leakage through the user's body to the ground. Some prior arts use a capacitive sensing element in each sensor. When a finger touches the sensor, its capacitance will be changed. Thus, a finger touch can be detected by measuring the capacitance variations of the sensor. On the other hand, in some prior arts, a touch detecting system is provided to include a flexible material, a top resistive conductor array and a bottom resistive conductor array, where the flexible material is used to separate the top resistive conductor array from bottom resistive conductor array and a resistance based sensing element is provided for each resistive conductor. When a finger touches the top resistive conductor array, a first resistive conductor of the top resistive conductor array will make contact with a second resistive conductor of the bottom resistive conductor array at touch point and thereby transfers the driving voltage from the first resistive conductor to the second resistive conductor by a voltage drop (IR drop) (please refer to U.S. Pat. No. 7,348,966 and U.S. Pat. No. 7,492,358). Unlike the conventional sensor array 100 having a plurality of sensing elements (capacitors or resistors), the conductive line array 310 of the invention includes no sensing elements. That means each of the conductive lines in the conductive line array 310 is not necessary to be composed of a resistive material or a capacitive material that offers sensing elements within itself. Accordingly, the invention can reduce the hardware cost without additional manufacturing process. In an alternate embodiment, without additional manufacturing process, the conductive line array is formed by a plurality of originally existing conductive lines arranged in a concentric circle pattern (i.e., forming a Polar coordinate system). According to the invention, the arrangement of the conductive lines of the conductive line array 310 allows the system to identify the finger's position. Thus, the invention is not limited to the Cartesian coordinate system and the Polar coordinate system, but fully extensible to any existing or yet-to-be developed coordinate systems.

In FIG. 3A, a resistor $R_1$ is used to create a voltage division. Meanwhile a capacitor $C_1$ is configured to pass AC signals but block DC signals, functioning as a DC open circuit and an AC short circuit. In this embodiment, according to a fixed frequency F, the driving unit 330 generates a driving signal A having a fixed period T ($=1/F$, e.g., the fixed-period waveform in FIG. 5B) within each measurement time interval $t_m$. The driving signal A is sequentially applied to each one conductive line of the conductive line array 310 through the resistor $R_1$, the capacitor $C_1$ and the multiplexer 370 for fixed-period sequence measurement. However, the invention is not limited to the fixed-period sequence measurement. Depending on various implementations, the driving unit 330 can be replaced with a driving unit 830 (its function will be discussed in a second embodiment and a third embodiment of the invention with reference to FIGS. 6A and 8A) for performing random-length sequence measurement. Optionally, the driving unit 330 can be replaced with a driving unit 930 (its function will be discussed in a fourth embodiment of the invention with reference to FIG. 9A) for selectively performing the fixed-period sequence measurement or the random-length sequence measurement. According to a random-length sequence, the driving unit 830 generates a random-length driving signal A (e.g., the random-length waveform in FIG. 5B) within each measurement time interval $t_m$. The driving unit 930 selectively generates either a random-length driving signal A or a fixed-period driving signal A within each measurement time interval $t_m$ according to a random-length sequence or a fixed frequency F. The above driving signal A can be a sinusoidal wave or a square wave depending on various implementations. Hereinafter, the first embodiment of FIG. 3A will be described with reference to the driving signal A acting as a fixed-period square wave.

According to a control signal CS1, the multiplexer 370 couples the output terminal of the driving unit 330 with one of the conductive lines (a conductive line $L_1$ is cited as an example in the following description) in the conductive line array 310. For example, the driving signal A is applied to the conductive line $L_1$. Correspondingly, the multiplexer 380 couples the conductive line $L_1$ with the input terminal of the buffer 351 according to a control signal CS2. Because of its properties of a high input impedance and a low output impedance, the buffer 351 is configured to isolate the conductive line array 310 from the signal extracting unit 352. The input impedance of the buffer 351 is very high, meaning that the input of the buffer 351 does not load down the source or draw any current from it. Because the output impedance of the buffer 351 is low, it drives the load as if it were a voltage source. The buffer 351 receives the output signal B and then generates a sensing signal C. Since the voltage gain of the buffer 351 is approximately unity, the sensing signal C is substantially equal to the signal B. After receiving the sensing signal C, the signal extracting unit 352 performs signal extraction using the driving signal A to generate a measuring value D.

Figure 3B:
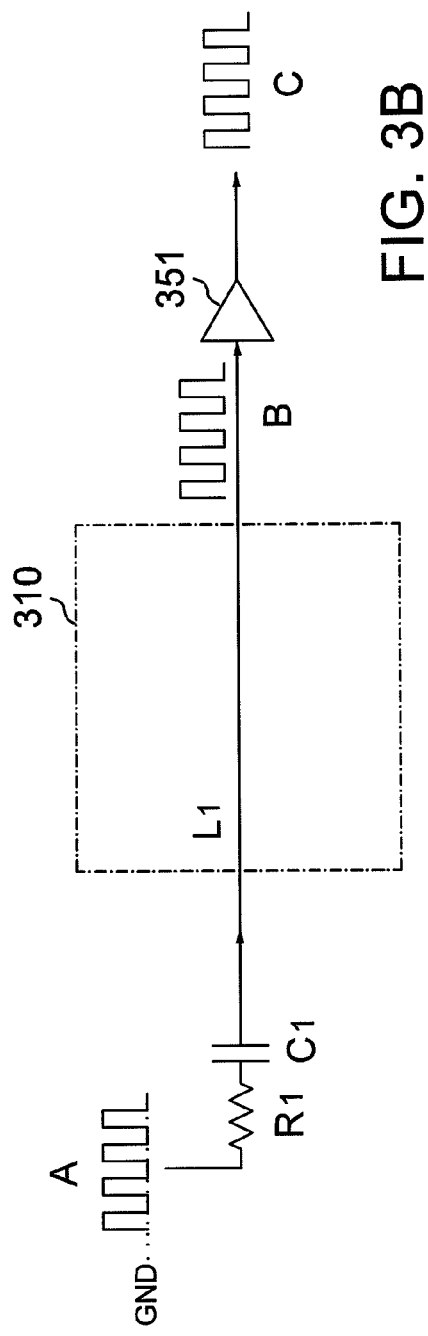
FIG. 3B is a simplified diagram showing the first embodiment of FIG. 3A in which no finger is placed on the conductive line array.

FIG. 3B is a simplified diagram showing the first embodiment of FIG. 3A in which no finger is placed on the conductive line array. Referring to FIG. 3B, one end of the conductive line $L_1$ receives the driving signal A from the driving unit 330 and the other end of the conductive line $L_1$ is coupled to the input terminal of the buffer 351. When no finger is placed on the conductive line array, the output signal C of the buffer 351 has the same period as the driving signal A, indicating two signals A and C have the same sequence.

Figure 3C:
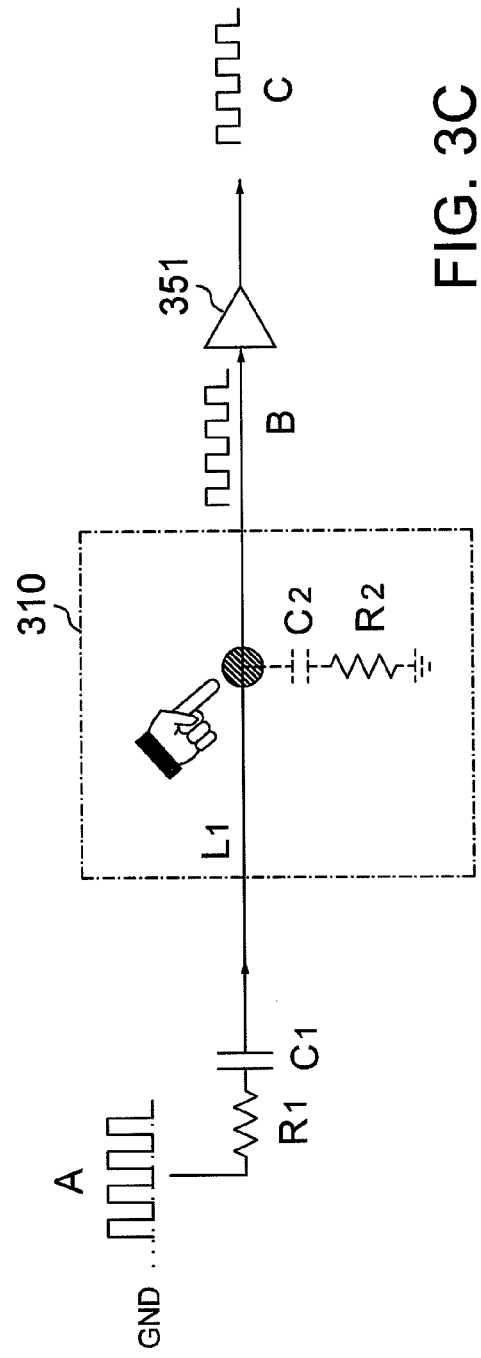
FIG. 3C is a simplified diagram showing the first embodiment of FIG. 3A in which a finger is placed on the conductive line array.

FIG. 3C is a simplified diagram showing the first embodiment of FIG. 3A in which a finger is placed on the conductive line array. When a finger is placed on the conductive line $L_1$, a leakage current flows from the conductive line $L_1$ through its human body to the ground. As shown in FIG. 3C, an equivalent circuit of the human body consists of a capacitor $C_2$ and a resistor $R_2$. When the human body is dry, the resistor $R_2$ has a high resistance of about 3K Ohm. By contrast, when the human body is moist or wet, the resistor $R_2$ has a low resistance of about 300 Ohm. The driving signal A is applied to the conductive line $L_1$ through the resistor $R_1$ having a resistance of about 30K Ohm. When the finger is actually placed on the conductive line $L_1$, a leakage current path to ground is created and then the amplitude of the input signal B of the buffer 351 is reduced as a result of voltage division. Accordingly, referring to FIGS. 3B and 3C, it is clear that the amplitude of the output signal C of the buffer 351 with a finger placed on the conductive line $L_1$ is less than the amplitude of the output signal C of the buffer 351 in the absence of a finger touch.

Figure 4A:
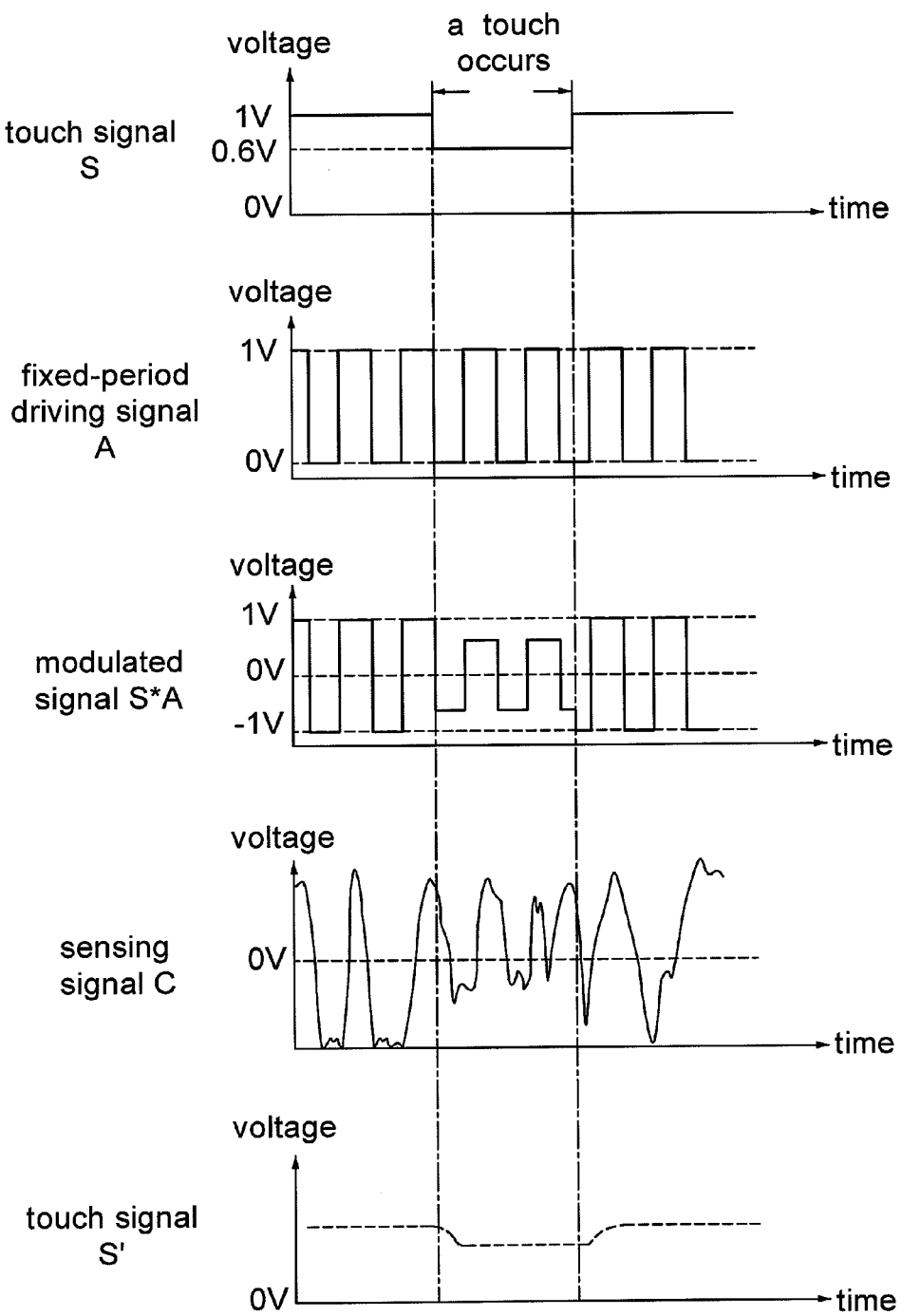
FIG. 4A is an example showing different signals of FIG. 3A.

FIG. 4A is an example showing different signals of FIG. 3A. Referring to FIGS. 3A and 4A, assuming that the left end of the conductive line $L_1$ is not connected with the multiplexer 370, but a DC voltage 1V is applied to the left end of the conductive line $L_1$ instead and a touch signal S illustrates one exemplary view of voltage magnitude variations in the waveform measured at the conductive line $L_1$. Besides, assuming that the touch signal S has a voltage level of 1V if no finger is placed on the conductive line $L_1$. When a user's finger is placed on the conductive line $L_1$, a leakage current path to ground will be created; hence, the voltage level of the touch signal S is reduced to e.g., 0.6V, depending on the voltage magnitude across the resistor $R_2$. In fact, applying the driving signal A to the conductive line $L_1$ via the resistor $R_1$, the capacitor $C_1$ and multiplexer 370 is equivalent to modulating the touch signal S with a fixed frequency F into a modulated signal S*A. After interfered by the ambient noise, the modulated signal S*A is applied to the buffer 351 to generate the sensing signal C. In addition to the modulated signal S*A, the sensing signal C includes various kinds of noise. Thus, the original modulated signal S*A that is contained in the sensing signal C and has the same period as the driving signal A from the sensing signal C becomes indistinguishable.

As previously discussed (the technical background and the reason for using signal orthogonality and how to reduce noise interference), the signal extracting unit 352 performs signal extraction by using the original driving signal A to obtain a touch signal S' having the same sequence (e.g. having the same frequency or period) as the driving signal A. The extracted touch signal S' includes only the noise present in the fixed frequency F in addition to the original touch signal S. The process of performing signal extraction is equivalent to performing signal demodulation to eliminate the noise of most frequency bands (e.g., low frequency noise, 50/60 Hz noise, 1/f noise, etc.). Thus, the invention can avoid noise interference and correctly respond to a finger touch.

Figure 4B:
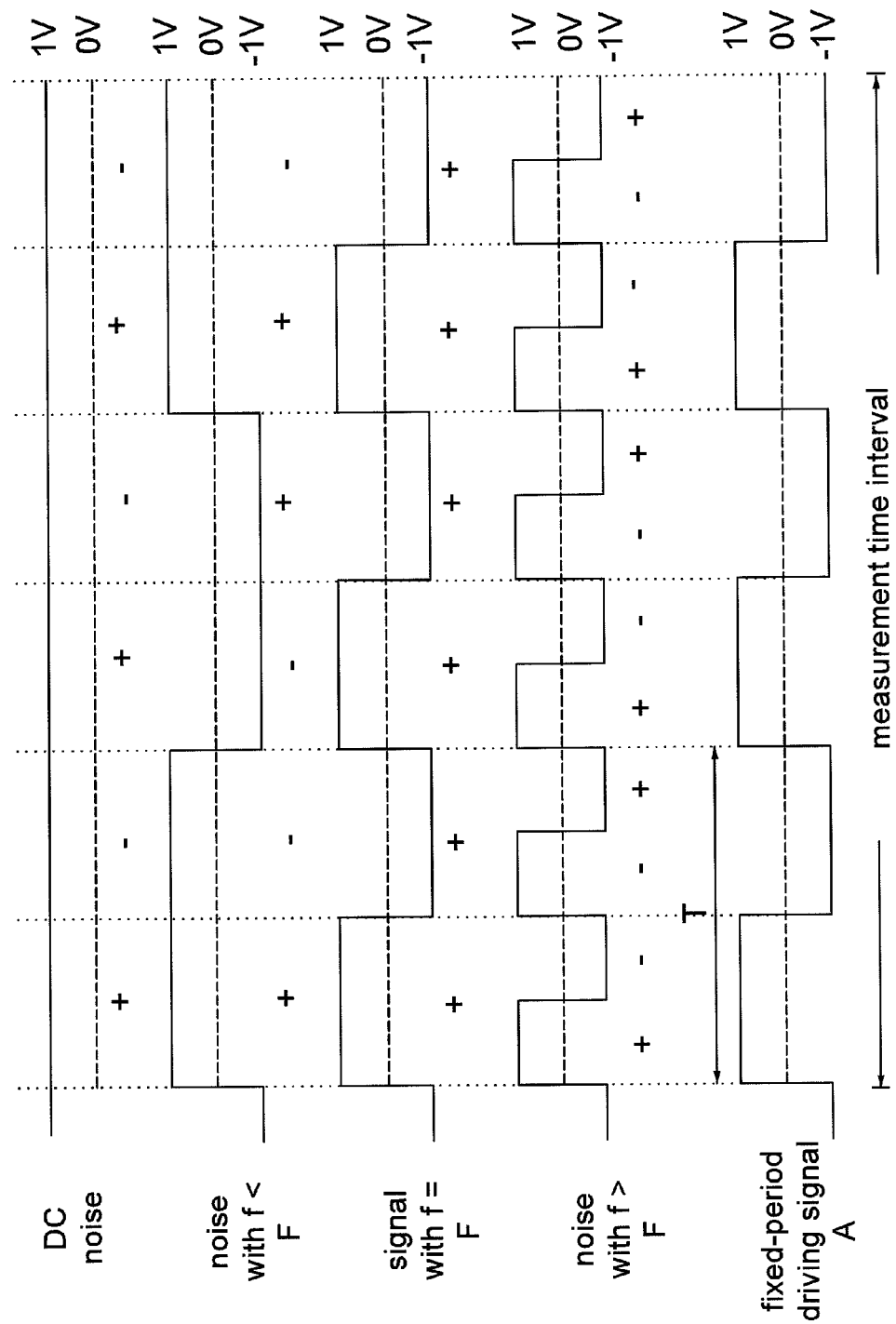
FIG. 4B is an exemplary diagram showing positive terms are canceled by negative terms with respect to noise having different frequencies while the extracting unit performs signal extraction.

FIG. 4B is an exemplary diagram showing positive terms are canceled by negative terms with respect to noise having different frequencies while the extracting unit performs signal extraction. Referring to FIG. 4B, assuming that the sensing signal C at least includes a DC noise, a noise having a frequency f less than F (f<F), a noise having a frequency f greater than F (f>F) and a signal having a frequency f equal to F, the driving signal A as shown at the bottom of FIG. 4B is a sequence with a fixed frequency F and a period T. Based on signal orthogonality, the signal extracting unit 352 performs signal extraction on the sensing signal C using the driving signal A to obtain a signal having the same sequence as the driving signal A. If the frequency of either the signal or noise contained in the sensing signal C is greater than or less than the frequency F, the signal extracting unit 352 will obtain a measuring value D of 0 after performing signal extraction. It is because the signal extraction causes positive terms and negative terms to cancel each other out. For example, as measured in volts (V), (1, 1, 1, 1, 1, 1) is a sequence of the voltage levels of a DC noise at the top of FIG. 4B and (1, −1, 1, −1, 1, −1) is a sequence of the voltage levels of the driving signal A. The signal extraction performed by the signal extracting unit 352 is to sum the products of the corresponding voltage levels of the DC noise and the driving signal A; meanwhile, each product of the corresponding voltage levels of the DC noise and the driving signal A is prefixed by a plus sign or a minus sign as shown at the lower part of the DC noise in FIG. 4B. As positive and negative terms cancel each other out, the measuring value D is given by D=1×1+1×(−1)+1×1+1×(−1)+1×1+1×(−1)=0. As shown in the middle of FIG. 4B, the signal having a fixed frequency F has the same sequence (i.e., (1, −1, 1, −1, 1, −1)) as the driving signal A. On the basis of signal orthogonality, the signal extracting unit 352 performs signal extraction (e.g., summing the products of the corresponding voltage levels of the signal having a fixed frequency F and the driving signal A) and then obtains the measuring value D=1×1+(−1)×(−1)+1×1+(−1)×(−1)+1×1+(−1)×(−1)=6. It is because their positive and negative terms do not cancel each other out. In this embodiment, the signal extracting unit 352 is implemented using a Multiply-and-Add accumulator in a DSP microcontroller. In an alternative embodiment, the above signal extraction (e.g., summing the products of the corresponding voltage levels of the signal having a fixed frequency F and the driving signal A) can be implemented in an analog form.

Referring back to FIG. 4A, after the signal extracting unit 352 performs signal extraction on the sensing signal C according to the driving signal A, only the touch signal S' having the same sequence as the driving signal A is obtained. The process of performing signal extraction is equivalent to performing signal demodulation and therefore noise interference from other frequencies is avoided. In fact, the process that the signal extracting unit 352 calculates the measuring value D, i.e., summing the products of the corresponding voltage levels of the signal having a fixed frequency F and the driving signal A, is equivalent to measuring the area under the waveform of the touch signal S' in FIG. 4A. In other words, the signal extracting unit 352 quantifies the area under the waveform of the touch signal S' to obtain the measuring value D. Obviously, the measuring value D will be smaller when a finger is placed on the conductive line $L_1$; in contrast, the measuring value D will be greater when no finger is placed on the conductive line $L_1$. With respect to circuit control, a microcontroller (not shown) first issues control signals CS1 and CS2 to the multiplexers 370 and 380 respectively to couple the conductive line $L_1$ with the output terminal of the multiplexer 380. Then, the microcontroller measures the magnitude of the measuring value D to determine whether a user's finger is placed on the conductive line $L_1$. Likewise, the microcontroller sequentially measures each of the conductive lines on x-axis and y-axis to obtain all the corresponding measuring values D. If a finger or a hand is actually placed on the conductive line array 310, the microcontroller will correctly identify the finger's or the hand's location.

Figure 4C:
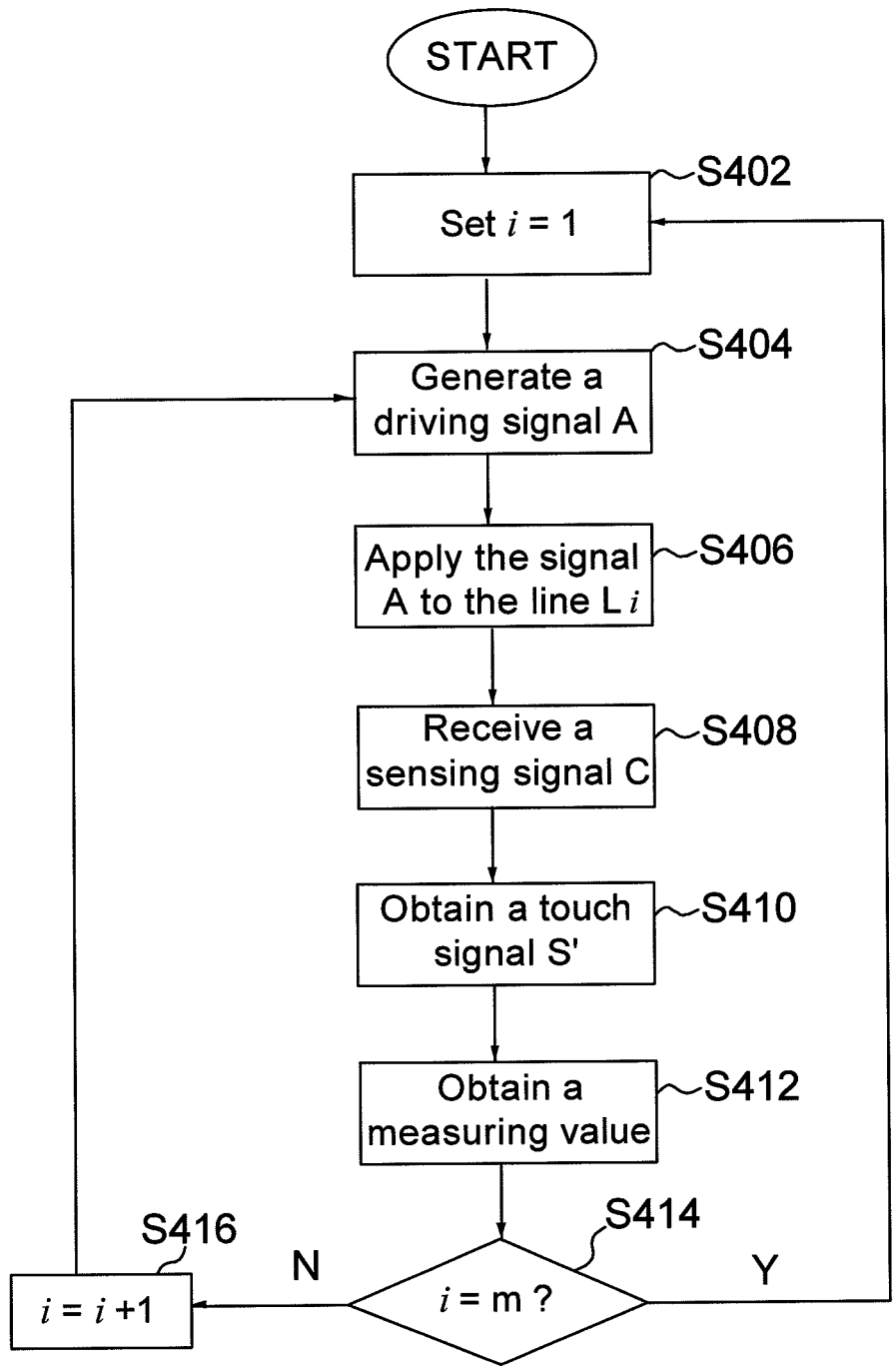
FIG. 4C is a flow chart showing a method of measuring the conductive line array 310 according to the embodiment of FIG. 3A.

FIG. 4C is a flow chart showing a method of measuring the conductive line array 310 according to the embodiment of FIG. 3A. With reference to FIGS. 3A and 4C, a method of measuring the conductive line array 310 is described as follows.

Step S402: Set the default value of a variable i to 1.

Figure 5A:
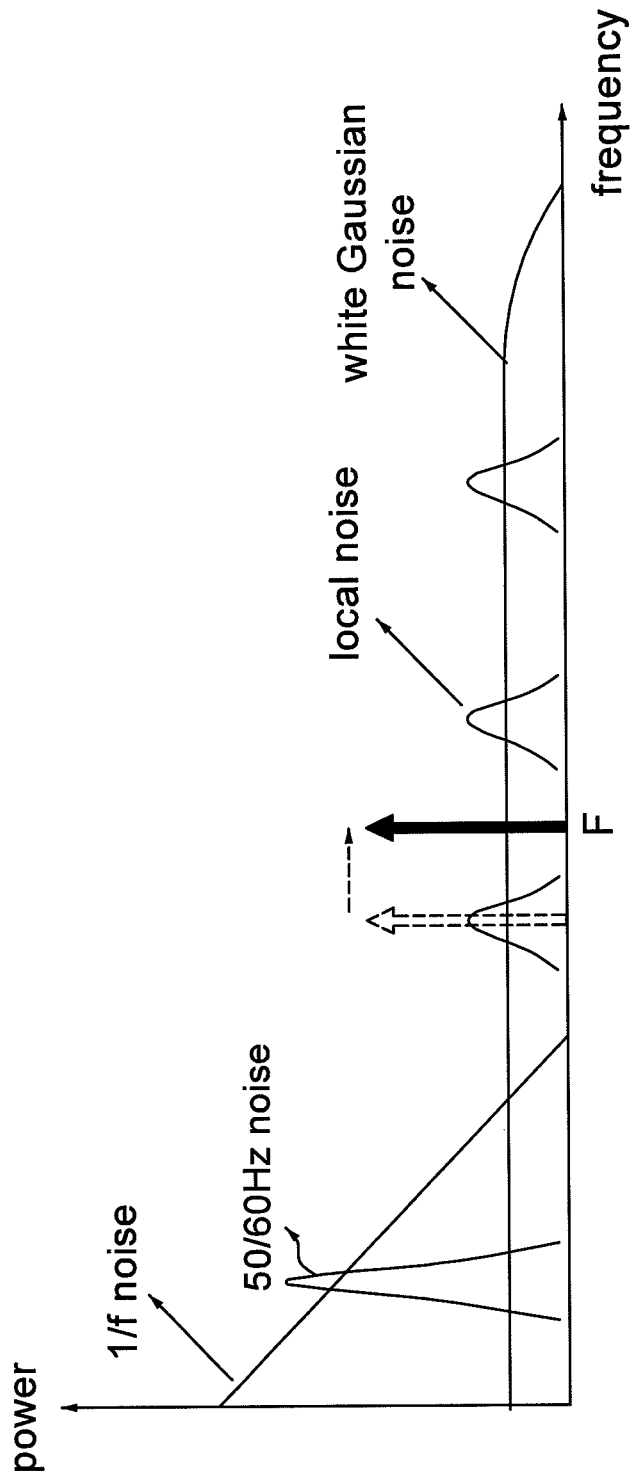
FIG. 5A shows an exemplary relationship between a fixed frequency F and a common noise distribution in frequency domain.
Figure 5B:
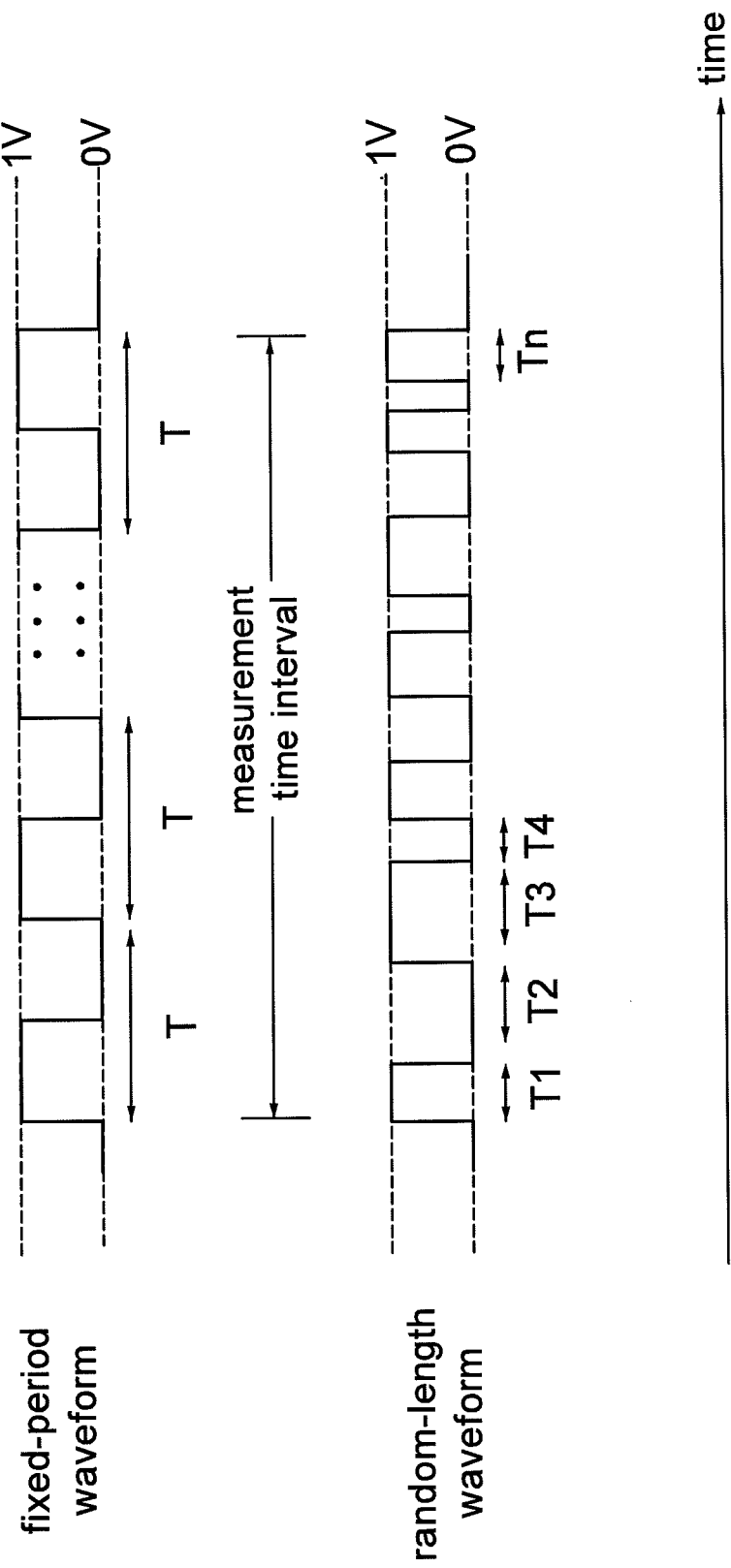
FIG. 5B is an exemplary diagram showing a fixed-period square-wave driving signal and a random-length square-wave driving signal.

Step S404: Within a measurement time interval $t_m$, the driving unit 330 generates a fixed-period driving signal A, as shown at the top of FIG. 5B.

Step S406: The driving unit 330 applies the fixed-period driving signal A to a conductive line Li.

Step S408: The signal extracting unit 352 receives a corresponding sensing signal C of the conductive line Li.

Step S410: According to the driving signal A and the sensing signal C, the signal extracting unit 352 performs signal extraction to obtain a touch signal S'.

Step S412: According to the touch signal S', the signal extracting unit 352 obtains a corresponding measuring value D associated with the conductive line Li.

Step S414: Compare the magnitudes of variables i and m (the total number of the conductive lines). If i≠m, the flow goes to step S416. If i=m, the flow returns to step S402.

Step S416: Increment the variable i by 1 and the flow returns to step S404.

It should be noted that the measuring method of FIG. 4C is not only adapted for applying a fixed-period driving signal, but for applying a random-length driving signal (as shown at the bottom of FIG. 5B). On the other hand, in the embodiment of FIG. 3A, the fixed frequency F inputted to the driving unit 330 is provided by a scanning circuit (not shown) that randomly scans throughout all frequency bands to obtain a noise distribution, e.g., at system startup or in the absence of finger touch. FIG. 5A shows an exemplary relationship between a fixed frequency F and a common noise distribution in frequency domain. According to the latest noise distribution, the scanning circuit selects a fixed frequency F from a frequency band containing less noise. Since the implementation of the scanning circuit is beyond the scope of this specification and well known to those skilled in the art, the details will not be described herein.

Figure 5C:
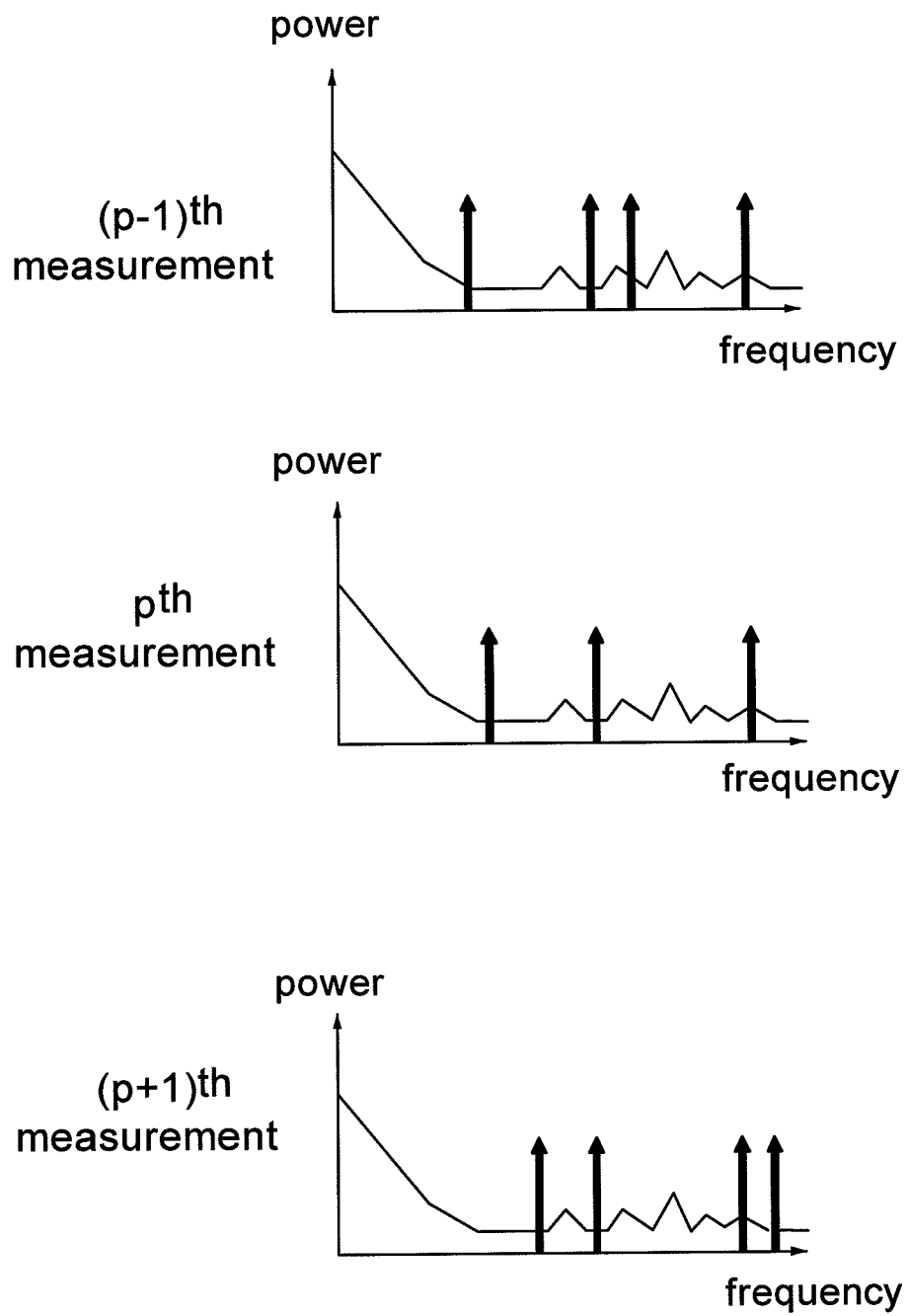
FIG. 5C is an exemplary diagram showing that different frequency components are combined randomly to generate different random-length sequences when the driving unit performs three measurements in a row.

In practical applications, when the fixed-period sequence measurement is applied, the circuit is subject to fixed noise interference. Thus, it is necessary for the scanning circuit to randomly perform frequency scan. To avoid the trouble of performing random frequency scan and a fixed frequency band noise attack, the driving unit of the invention additionally provides a random-length sequence by randomly combining different modulation frequencies within each measurement time interval $t_m$. In other words, the modulated signals are randomly distributed throughout the frequency bands to minimize the risk of the fixed frequency band noise attack. Thus, the circuit is immune from the noise interference of a certain frequency. FIG. 5B is an exemplary diagram showing a fixed-period square-wave driving signal and a random-length square-wave driving signal. The fixed-period sequence measurement and the random-length sequence measurement are hereinafter explained by analogy with keys in the encryption and the decryption. The fixed-period sequence measurement corresponds to using a fixed key in the encryption and the decryption. By contrast, the random-length sequence measurement corresponds to using different keys in a specific order in the encryption (e.g., at the driving unit 630) and sequentially using the keys in the decryption (at the signal extracting unit 352). FIG. 5C is an exemplary diagram showing that different frequency components are combined randomly to generate different random-length sequences when the driving unit performs three measurements in a row. The process of generating the random-length sequences is random (i.e., different frequency components are randomly combined to generate a corresponding random-length sequence), so the circuit can effectively avoid noise attack. The fixed-period sequence measurement can be adapted for use if its peripheral circuit is equipped with the above scanning circuit to identify a frequency band with minimum noise. By contrast, if the measurement time interval is sufficient, the random-length sequence measurement can be adapted for use without the scanning circuit. Depending on various implementations, the fixed-period sequence measurement and the random-length sequence measurement can be selectively adapted for use to achieve an integration effect.

Figure 6A:
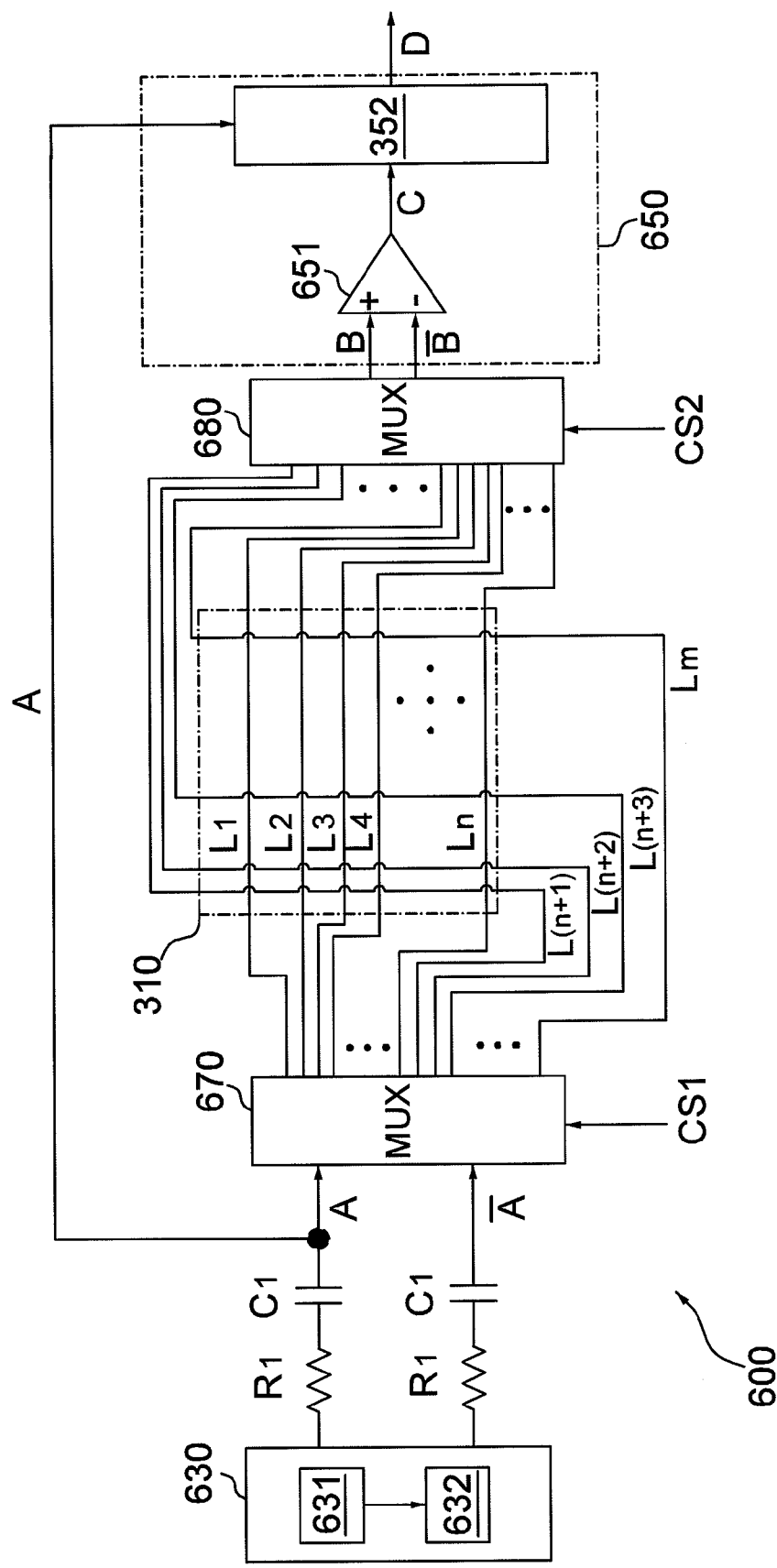
FIG. 6A is a block diagram of a touch detecting device according to a second embodiment of the invention.

FIG. 6A is a block diagram of a touch detecting device according to a second embodiment of the invention. Referring to FIG. 6A, a touch detecting device 600 of the invention, adapted for use in a touch panel (not shown), includes a conductive line array 310, a driving unit 630, a sensing circuit 650 and two multiplexers 670, 680. In addition, the driving circuit 630 includes a random number generator 631 and a random-length wave generator 632 while the sensing circuit 650 includes a differential amplifier 651 and a signal extracting unit 352.

By way of example without limitation, the random number generator 631 is implemented using a linear feedback shift register in order to generate a sequence of pulses with random time spacings (hereinafter called "the random-length sequence"), e.g., (T1, T2, T3, ..., Tn). Here, a measurement time interval is given by $t_m$=T1+T2+T3+ ... +Tn, where T1, T3, T5 ... denotes time intervals of high voltage levels and T2, T4, T6 ... denotes time intervals of low voltage levels. Afterward, according to the random-length sequence (T1, T2, T3, ..., Tn) generated by the random number generator 631, the random-length wave generator 632 generates a random-length square-wave driving signal A as depicted in FIG. 5B. For example, assuming that (1.2, 2.4, 1.7, 2.3, ..., 1.5) is a random-length sequence generated by the random number generator 631, the waveform of the driving signal A, generated by the random-length wave generator 632, holds a high voltage of 1V for 1.2 μs (T1), a low voltage of 0V for 2.4 μs (T2), a high voltage of 1V for 1.7 μs (T3), a low voltage of 0V for 2.3 μs (T4), ... and a high voltage of 1V for 1.5 μs (Tn). The high voltage levels of the fixed-period waveform and the random-length waveform in FIG. 5B are exemplified by 1V. Depending on various implementations, the high voltages of the fixed-period waveform and the random-length waveform may be configured to be other voltage levels, e.g., 1.5V. The higher the voltage level, the better the SNR becomes, but at a cost to high voltage manufacturing process or high power consumption. Depending on different hardware costs, the circuit designer may select a suitable voltage level. In addition, the above random-length square-wave driving signal A may be replaced with a random-length sinusoidal-wave driving signal A.

Figure 6B:
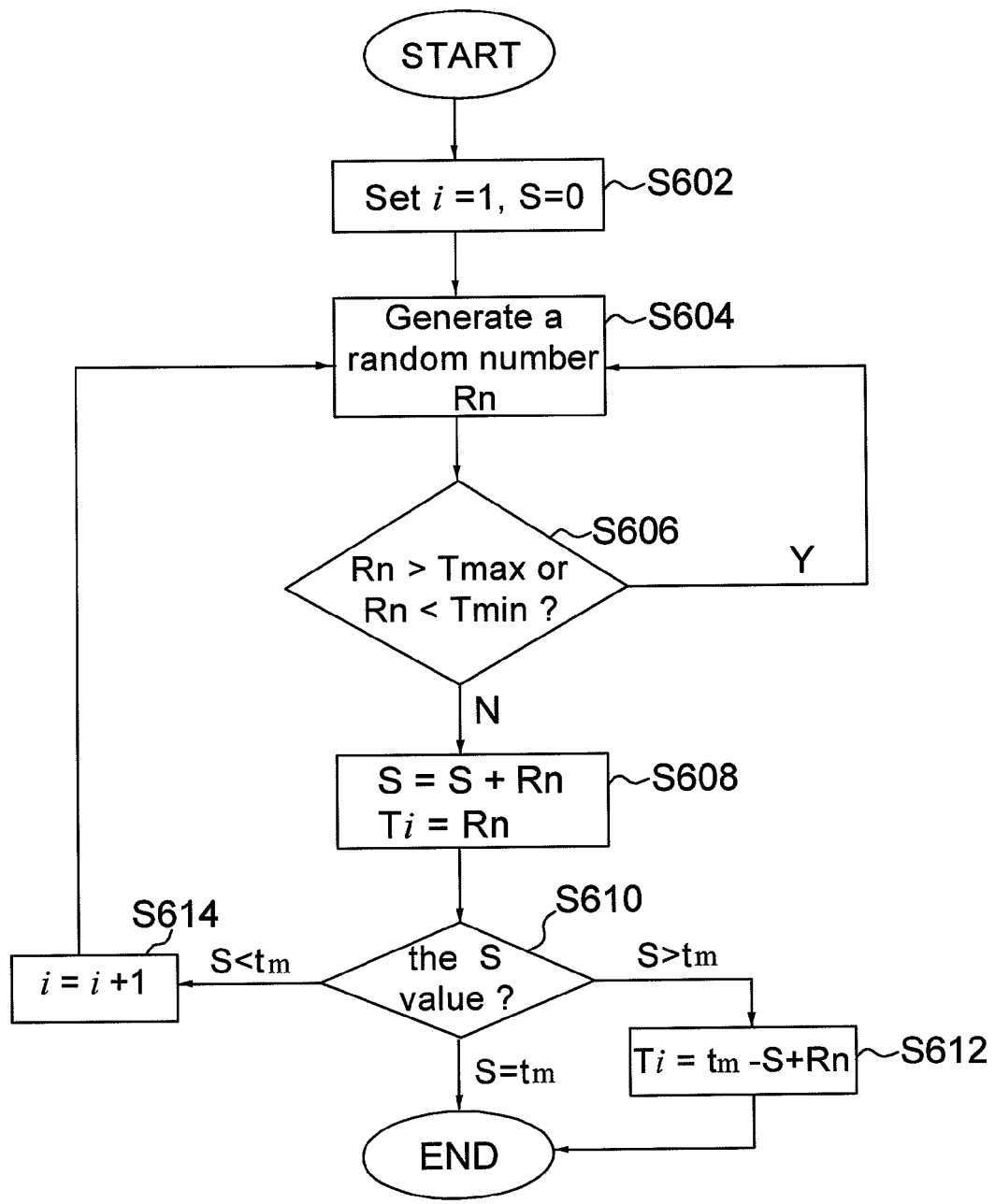
FIG. 6B is a flow chart showing a method of generating a random-length sequence.

FIG. 6B is a flow chart showing a method of generating a random-length sequence. With reference to FIGS. 6A and 6B, a method of generating a random-length sequence is described as follows.

Step S602: Set the default values of variables i and S to 1 and 0, respectively, where i denotes a time interval index in the random-length sequence (T1, T2, T3, . . . , Ti, . . . , Tn).

Step S604: Generate a random number Rn by using the random number generator 631.

Step S606: Determine whether Rn is greater than a maximum value $T_{max}$ or less than a minimum value $T_{min}$. If YES, the flow returns to step S604; otherwise, the flow goes to step S608.

Step S608: The variable S is used to count the random number Rn (i.e., S=S+Rn) and set Ti to Rn.

Step S610: Compare the magnitude of the variable S with the measurement time interval $t_m$. If S is less than the measurement time interval $t_m$, the flow goes to step S614. If S is greater than the measurement time interval $t_m$, the flow goes to step S612; otherwise, the flow is terminated.

Step S612: Set Ti to $(t_m-S+Rn)$, i.e., $Ti=t_m-S+Rn$.

Step S614: Increment the variable i by one. Then, the flow returns to step S604.

Within each measurement time interval $t_m$, the driving unit 630 generates two complementary random-length square waves A and $\overline{A}$ referenced to a common ground and meanwhile sends the two square waves A and $\overline{A}$ to any two neighboring conductive lines arranged in the same direction (on x-axis or y-axis) of the conductive line array 310 via the resistor $R_1$, the capacitor $C_1$ and the multiplexer 670. According to the control signal CS1, the multiplexer 670 connects outputs terminals of the driving unit 630 with two corresponding neighboring conductive lines arranged in the same direction (the two conductive lines $L_1$ and $L_2$ are hereinafter cited as an example) to allow square waves A and $\overline{A}$ to be applied to the two conductive lines $L_1$ and $L_2$. Correspondingly, according to the control signal CS2, the multiplexer 680 connects the two conductive lines $L_1$ and $L_2$ with two input terminals of the differential amplifier 651. Because of its better common mode noise rejection, the differential amplifier 651 is provided to null out low-frequency noises that appear at both inputs. In the second embodiment, the same numerals are used for components identical to the first embodiment, and repeated description is omitted.

In the second embodiment of FIG. 6A, the invention is not limited to the driving unit 630 that generates the two complementary random-length square waves A and $\overline{A}$ referenced to a common ground for the random-length sequence measurement. According to various implementations of the second embodiment, the driving unit 630 may be replaced with a fixed-period driving unit that generates two complementary fixed-period square waves A and $\overline{A}$ referenced to a common ground for the fixed-period sequence measurement. Optionally, the driving unit 630 may be replaced with a driving unit 935 (its function will be discussed in a fifth embodiment of the invention with reference to FIG. 9B) that selectively generates either two complementary random-length driving signals A and $\overline{A}$ referenced to a common ground or two complementary fixed-period driving signals A and $\overline{A}$ referenced to a common ground for selectively performing the fixed-length sequence measurement or the random-length sequence measurement. According to a fixed frequency F, the fixed-period driving unit generates two complementary fixed-period square waves A and $\overline{A}$ referenced to a common ground within each measurement time interval $t_m$ and meanwhile sends the two fixed-period square waves A and $\overline{A}$ to any two neighboring conductive lines arranged in the same direction (on x-axis or y-axis) of the conductive line array 310 via the resistor $R_1$, the capacitor $C_1$ and the multiplexer 670. According to a fixed frequency F or a random-length sequence generated by a random number generator 631, the driving unit 935 selectively generates either two complementary random-length driving signals A and $\overline{A}$ referenced to a common ground or two complementary fixed-period driving signals A and $\overline{A}$ referenced to a common ground within each measurement time interval $t_m$ and then sends the two square waves A and $\overline{A}$ to any two neighboring conductive lines arranged in the same direction (on x-axis or y-axis) of the conductive line array 310 via the resistor $R_1$, the capacitor $C_1$ and the multiplexer 670. Depending on various implementations, the two complementary square waves A and $\overline{A}$ may be replaced with two complementary sinusoidal waves A and $\overline{A}$. Hereinafter, the second embodiment of FIG. 6A will be described with reference to the driving unit 630 that generates the two complementary random-length square waves A and $\overline{A}$ referenced to a common ground.

Figure 6C:
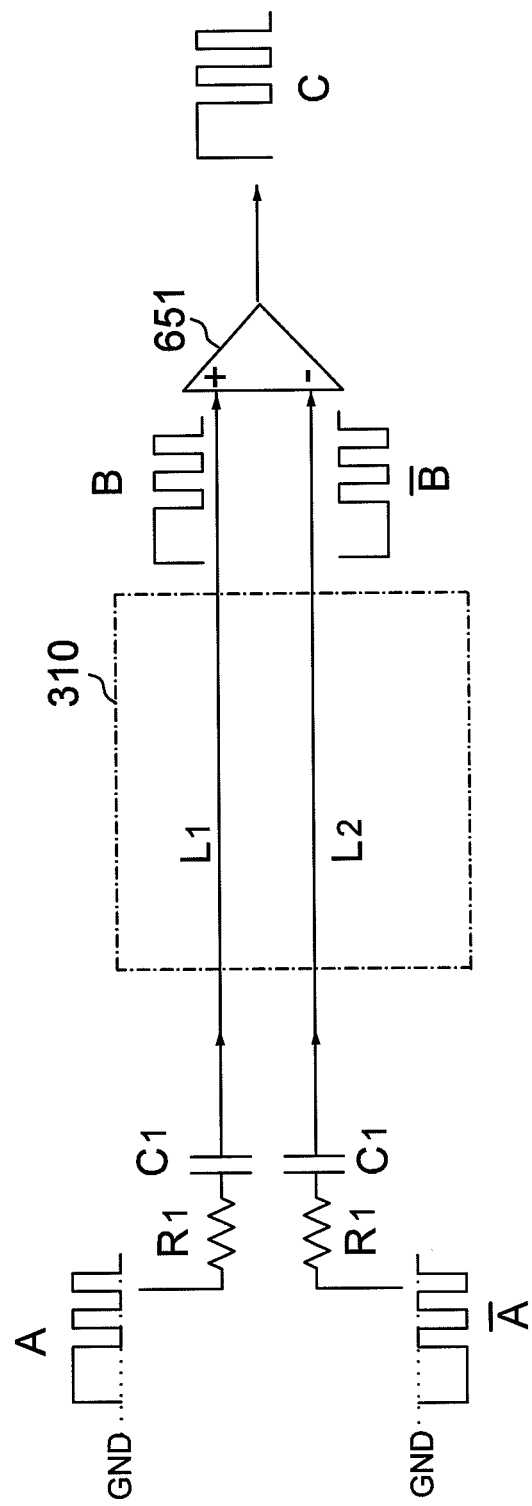
FIG. 6C is a simplified diagram showing the second embodiment of FIG. 6A in which no finger is placed on the conductive line array.

FIG. 6C is a simplified diagram showing the second embodiment of FIG. 6A in which no finger is placed on the conductive line array. Referring to FIG. 6C, two ends of the conductive line $L_1$ and $L_2$ receive the two complementary random-length square waves A and $\overline{A}$ from the driving unit 630 and the other two ends of the conductive lines $L_1$ and $L_2$ are coupled to the two input terminals of the differential amplifier 651. When no finger is placed on the conductive lines $L_1$ and $L_2$, the output signal C of the differential amplifier 651 has the same period as the square waves A and $\overline{A}$, indicating the square waves A and $\overline{A}$ and the output signal C have the same sequences.

Figure 6D:
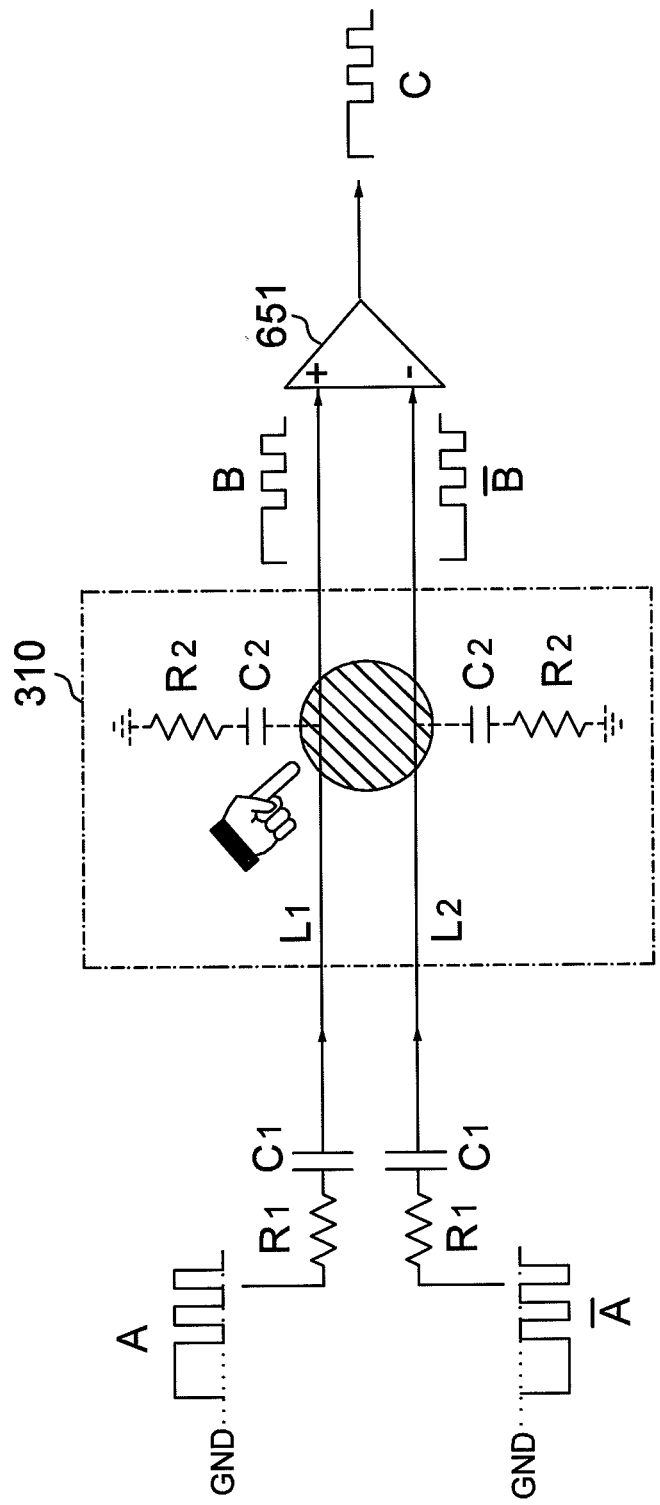
FIG. 6D is a simplified diagram showing the second embodiment of FIG. 6A in which a finger is placed on two neighboring conductive lines.

FIG. 6D is a simplified diagram showing the second embodiment of FIG. 6A in which a finger is placed on two neighboring conductive lines. When a finger is placed on the two neighboring conductive line $L_1$ and $L_2$, a leakage current flows from the conductive lines $L_1$ and $L_2$ through its human body to the ground and an equivalent circuit of the human body consists of a capacitor $C_2$ and a resistor $R_2$ as shown in FIG. 6D. As a result of voltage division, the amplitudes of the input signals B and $\overline{B}$ of the differential amplifier 651 are reduced. Accordingly, referring to FIGS. 6C and 6D, it is clear that the amplitude of the output signal C of the differential amplifier 651 with a finger placed on the two neighboring conductive line $L_1$ and $L_2$ is less than the amplitude of the output signal C of the differential amplifier 651 in the absence of a finger touch. In practice, even though the finger is only placed on one of the two neighboring conductive line $L_1$ and $L_2$, the amplitude of the output signal C of the differential amplifier 651 will be reduced as well. Thus, when one or both of the two neighboring conductive line $L_1$ and $L_2$ are touched, the amplitude of the output signal C of the differential amplifier 651 will be reduced similarly, resulting in a reduced area under the waveform of the touch signal S" as shown in FIG. 7 and a reduced measuring value D outputted from the signal extracting unit 352 (with respect to a measuring value D in the absence of a finger touch).

Figure 7:
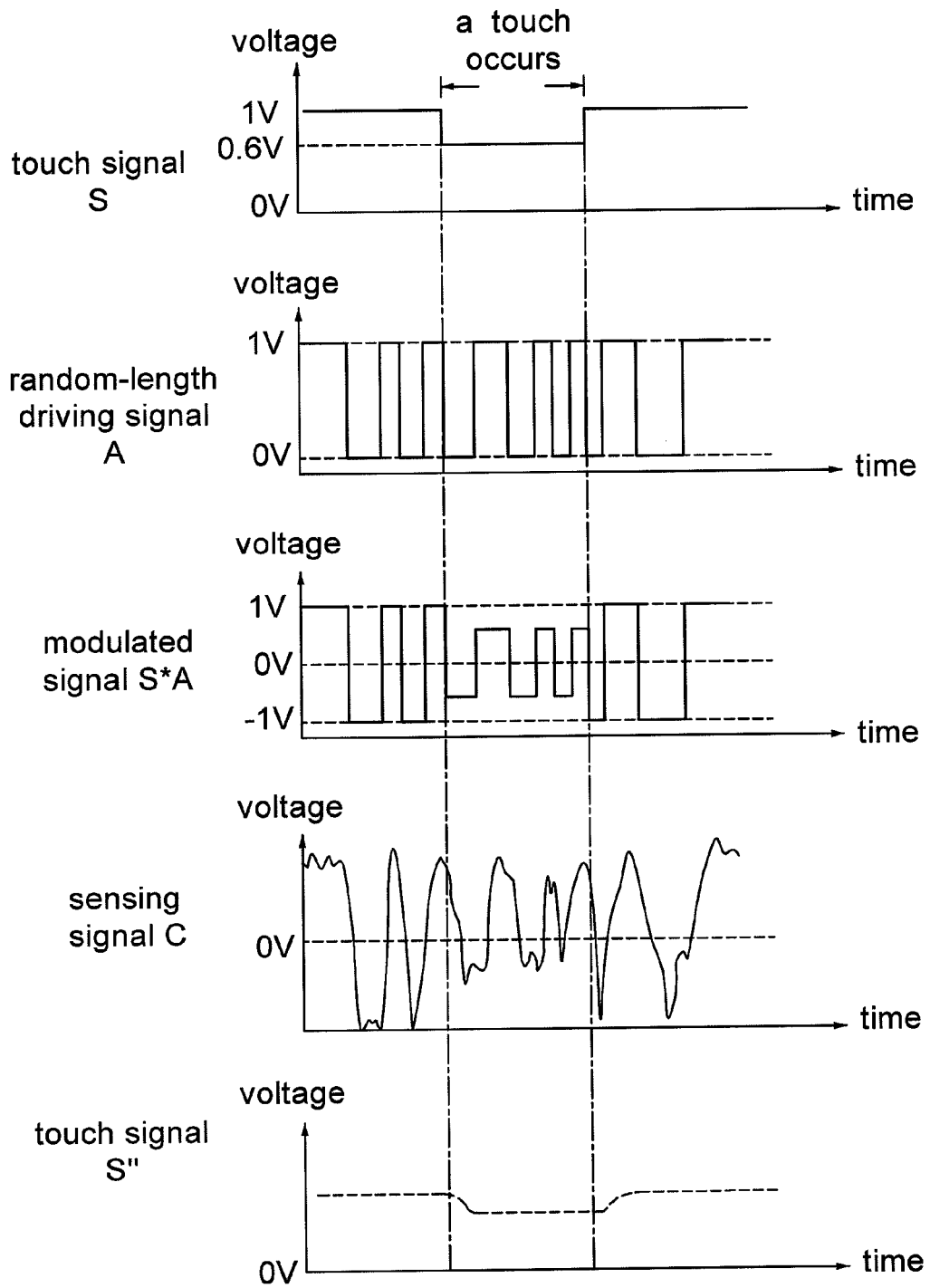
FIG. 7 is an example showing different signals of FIG. 6A.

FIG. 7 is an example showing different signals of FIG. 6A. Referring to FIGS. 4A and 7, the driving signal in FIG. 4A is a fixed-period square-wave signal while the driving signal in FIG. 7 is a random-length square-wave signal. Referring to FIG. 7, applying the two complementary random-length square waves A and $\overline{A}$ to the conductive line $L_1$ via the resistor $R_1$, the capacitor $C_1$ and multiplexer 670 is equivalent to modulating the touch signal S with a plurality of different frequency components $f_1$-$f_n$ into a modulated signal S*A. After interfered by the ambient noise, the modulated signal S*A is applied to the differential amplifier 651 to generate the sensing signal C. Although the differential amplifier 651 already eliminates some low-frequency noise, the sensing signal C still includes various kinds of noise in addition to the modulated signal S*A. Thus, the original modulated signal S*A that is contained in the sensing signal C and has the same random-length sequence as the driving signal A becomes indistinguishable.

Based on signal orthogonality, the signal extracting unit 352 performs signal extraction (e.g., summing the products of the corresponding voltage levels of the sensing signal C and the driving signal A) on the sensing signal C using the random-length driving signal A to obtain a touch signal S", which has the same sequence as the driving signal A. If the frequency of either the signal or noise contained in the sensing signal C is not equal to each of the plurality of frequency components $f_1$-$f_n$, the signal extraction performed by the signal extracting unit 352 will cancel out the positive and negative terms. At last, the extracted touch signal S" includes only the noise present in the frequency components $f_1$-$f_n$ in addition to the original touch signal S. The process of performing signal extraction is equivalent to performing signal demodulation and thus the noise of most frequency bands is eliminated. Thus, the invention can avoid noise interference and correctly respond to a finger touch. It should be noted that, when the extracting unit 352 performs signal extraction, with respect to a noise or a signal having a frequency different from those of the driving signal, the effect that the positive terms are canceled by negative terms as shown in FIG. 4B is produced not only in making the fixed-period sequence measurement, but in making the random-length sequence measurement. However, with respect to the random-length sequence measurement, the effect that the positive terms are canceled by negative terms associated with a noise or a signal having frequencies different from those of the driving signal can be observed only when the time axis is extended long enough.

Figure 8A:
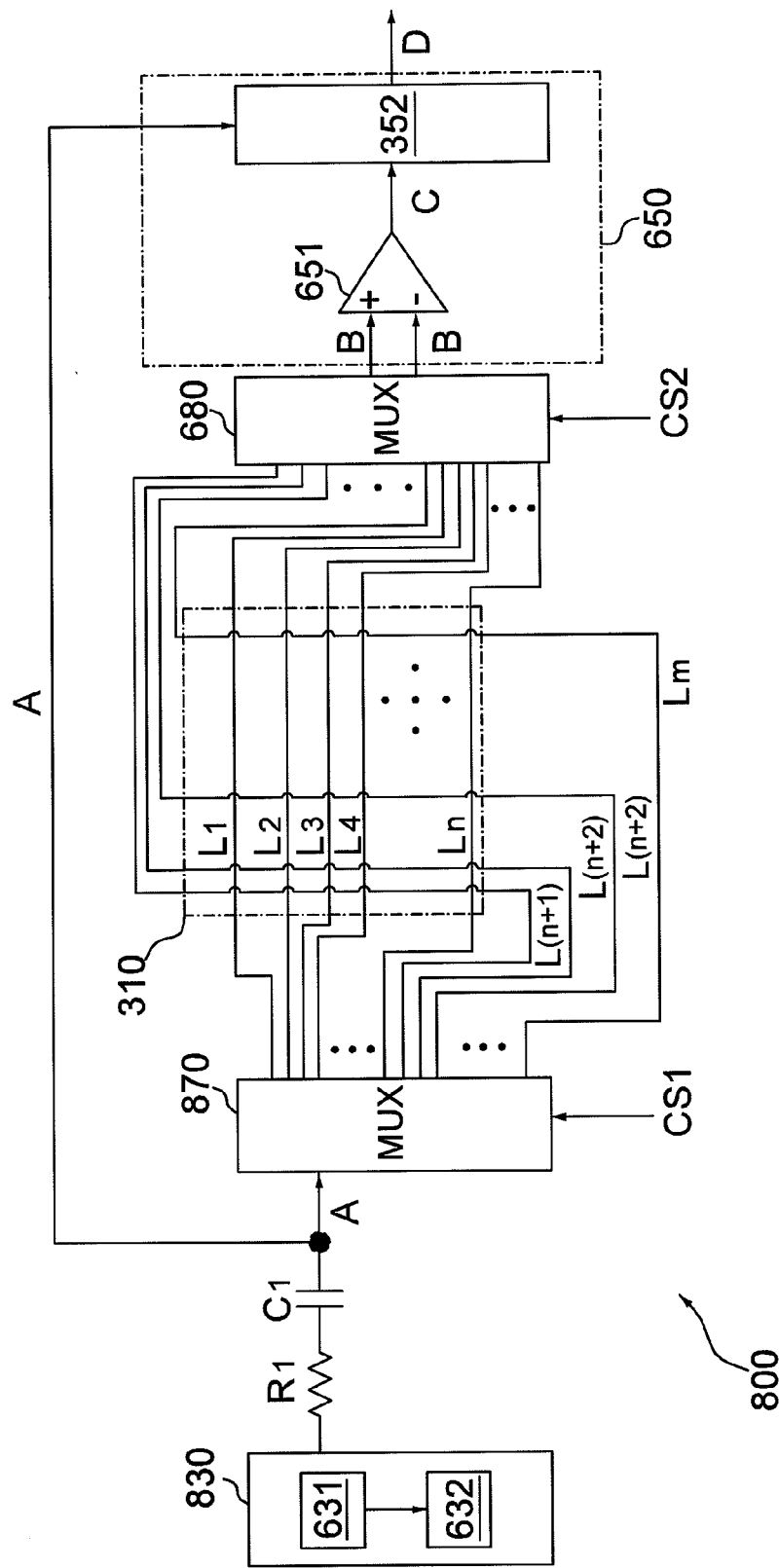
FIG. 8A is a block diagram of a touch detecting device according to a third embodiment of the invention.

FIG. 8A is a block diagram of a touch detecting device according to a third embodiment of the invention. The same numerals are used for components identical to the first and the second embodiments, and repeated description is omitted. Referring to FIGS. 6A and 8A, a difference between the second and the third embodiments is as follows. The driving unit 630 generates two complementary random-length square-wave driving signal A and $\overline{A}$ referenced to a common ground for the random-length sequence measurement while the driving unit 830 generates a random-length square-wave driving signal A for the random-length sequence measurement. The third embodiment is not limited to the driving unit 830 that generates a random-length square-wave driving signal A for the random-length sequence measurement. The driving unit 830 of a touch detecting device 800 may be replaced with the driving unit 330 for fixed-period sequence measurement. Optionally, the driving unit 830 of a touch detecting device 800 may be replaced with the driving unit 930 (its function will be discussed in a fourth embodiment of the invention with reference to FIG. 9A) for selectively performing the fixed-period sequence measurement or the random-length sequence measurement. Depending on various implementations, the driving unit 830 may generate a random-length sinusoidal square wave A instead. Hereinafter, the third embodiment of FIG. 8A will be described with reference to the driving unit 830 that generates a random-length square-wave driving signal A.

According to the control signal CS1, the multiplexer 870 connects the output terminal of the driving unit 830 with two corresponding neighboring conductive lines arranged in the same direction (the two conductive lines $L_1$ and $L_2$ are cited as an example) to allow the random-length square wave A to be applied to the two conductive lines $L_1$ and $L_2$ simultaneously. Correspondingly, according to the control signal CS2, the multiplexer 680 connects the two conductive lines $L_1$ and $L_2$ with two input terminals of the differential amplifier 651.

Figure 8B:
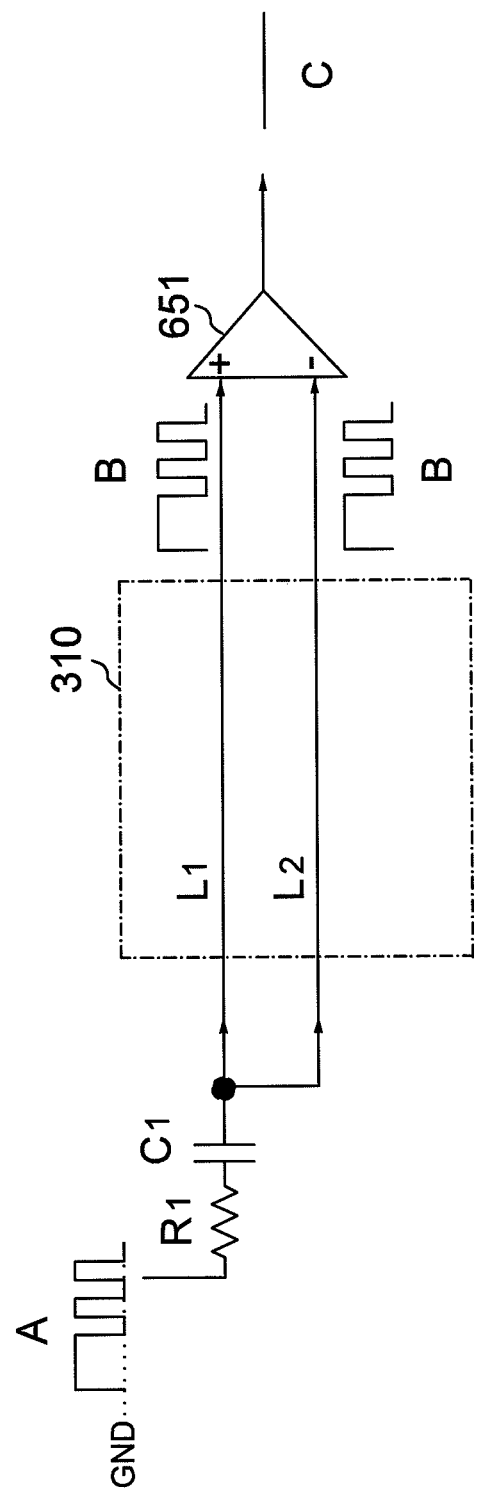
FIG. 8B is a simplified diagram showing the third embodiment of FIG. 8A in which no finger is placed on the conductive line array.
Figure 8C:
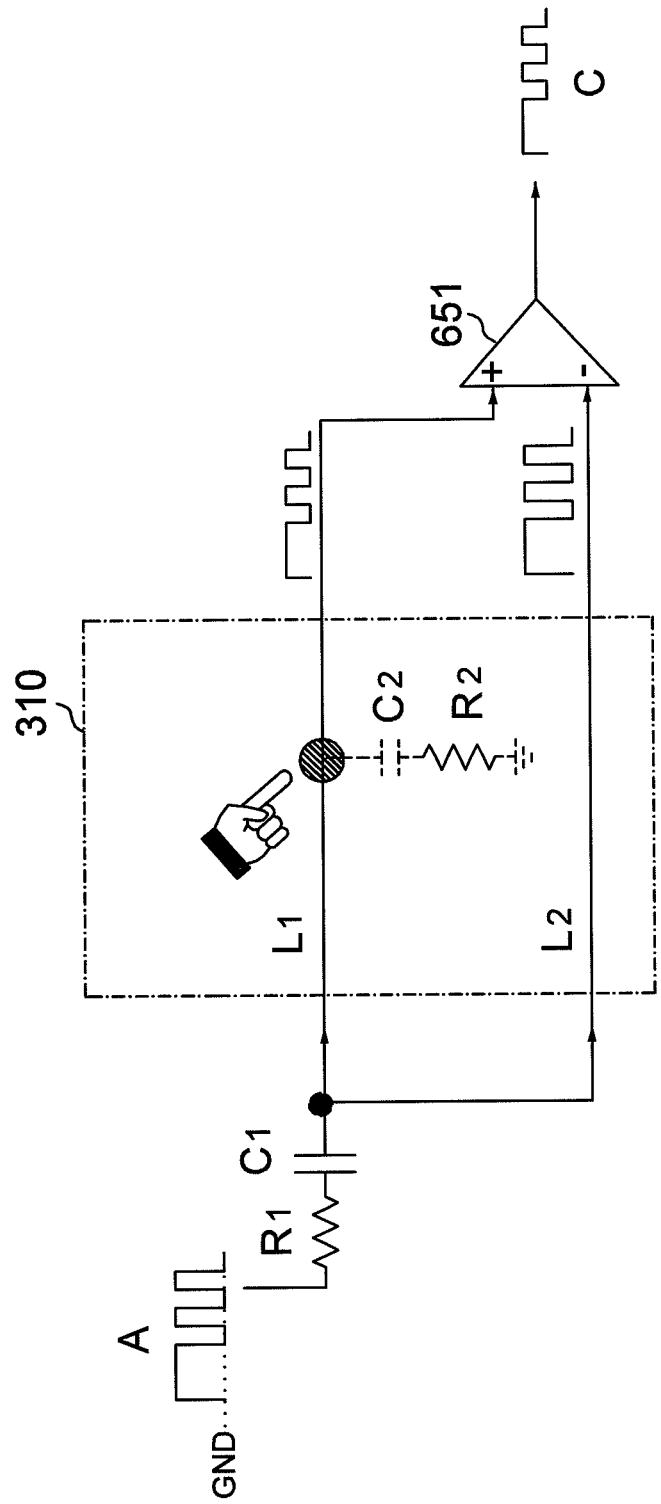
FIG. 8C is a simplified diagram showing the third embodiment of FIG. 8A in which a finger is placed on one of the conductive lines $L_1$ and $L_2$.

FIG. 8B is a simplified diagram showing the third embodiment of FIG. 8A in which no finger is placed on the conductive line array. Referring to FIG. 8B, two ends of the conductive line $L_1$ and $L_2$ receive the random-length square wave A from the driving unit 830 and the other two ends of the conductive line $L_1$ and $L_2$ are coupled to the two input terminals of the differential amplifier 651. When no finger is placed on the conductive line array 310, the differential amplifier 651 nulls out two input signals to generate a DC voltage signal having a voltage of 0V (in practice, the two input terminals of the differential amplifier 651 may suffer from noise interference respectively and then generates an AC voltage signal with a tiny amplitude). FIG. 8C is a simplified diagram showing the third embodiment of FIG. 8A in which a finger is placed on one of the conductive lines $L_1$ and $L_2$. When a finger is placed on one (e.g., $L_1$) of the conductive lines $L_1$ and $L_2$, a leakage current path to ground is created and then the voltage amplitude of the conductive line $L_1$ is reduced as a result of voltage division. Accordingly, this causes the differential amplifier 651 to generate an AC voltage signal having the same period as the driving signal A, indicating two signals A and C have the same sequence. Obviously, the amplitude of the output signal C with a finger placed on the conductive line $L_1$ is greater than the amplitude of the output signal C in the absence of a finger touch.

Figure 8D:
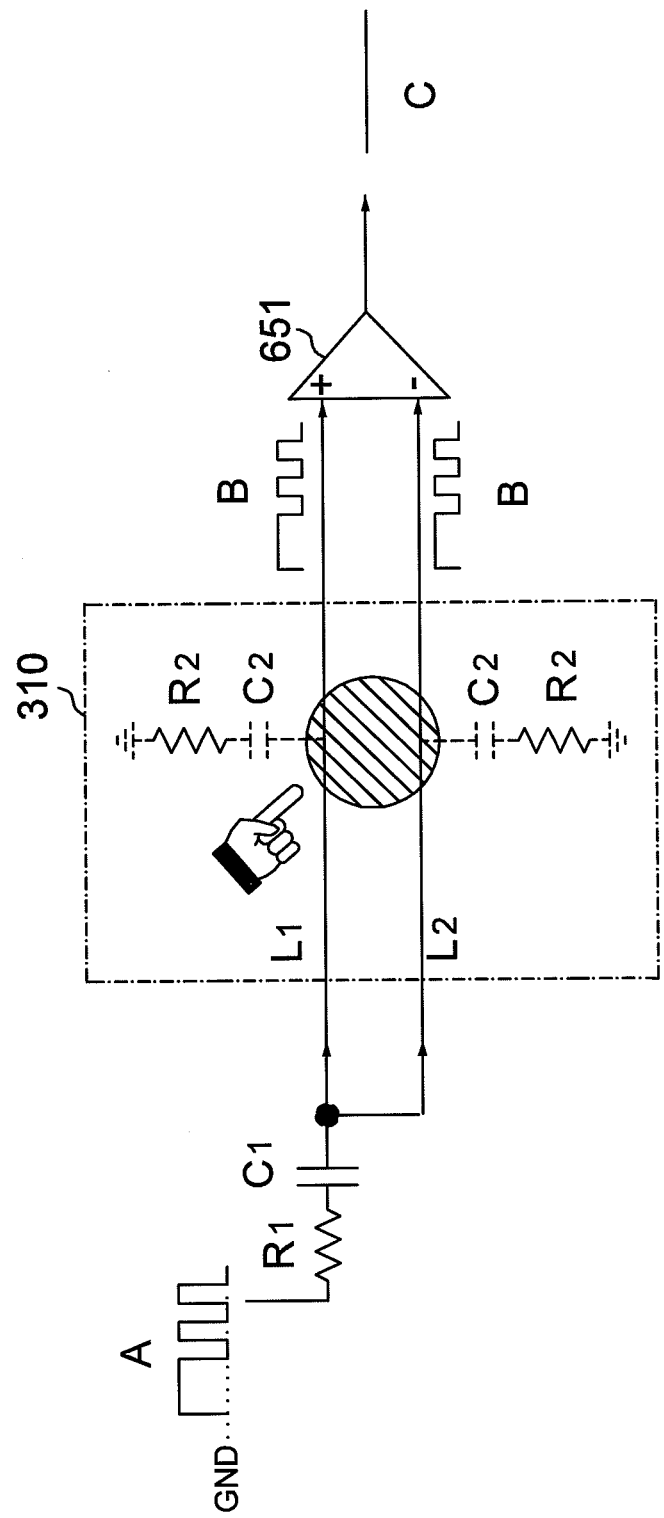
FIG. 8D is a simplified diagram showing the third embodiment of FIG. 8A in which a finger is placed on two neighboring conductive lines simultaneously.

However, there is an inherent drawback in the structure of the third embodiment of FIG. 8A. FIG. 8D is a simplified diagram showing the third embodiment of FIG. 8A in which a finger is placed on two neighboring conductive lines simultaneously. Referring to FIG. 8D, when a finger is simultaneously placed on the two conductive lines $L_1$ and $L_2$ coupled with two input terminals of the same differential amplifier, a leakage current path to ground is created and then the voltage amplitudes of the two conductive lines $L_1$ and $L_2$ are reduced simultaneously. Besides, since two input signals of the differential amplifier 651 are in phase, the differential amplifier 651 generates a DC voltage signal C. Thus, the output signal C with a finger placed on the two conductive lines $L_1$ and $L_2$ is the same as the output signal C in the absence of a finger touch. In these two cases, the signal extracting unit 352 equally obtains a measuring value D of 0. Thus, it is hard for the system to determine whether a finger is placed on the conductive line array 310. In practice, when a finger is placed on the two conductive lines $L_1$ and $L_2$, the two input terminals of the differential amplifier 651 may also suffer from noise interference respectively and thus generate an AC voltage signal C with a tiny amplitude. However, it is still hard for the system to distinguish the output signal C with a finger placed on the two conductive lines $L_1$ and $L_2$ from the output signal C in the absence of a finger touch.

To avoid the above problems, the control signals CS1 and CS2 and the two multiplexers 870 and 680 are configured to perform logical rearrangement on the conductive lines of the conductive line array 310. This makes the spacing between two conductive lines coupled to the same differential amplifier 651 greater than a finger width in order to prevent the two conductive lines applied to the same differential amplifier 651 from being simultaneously touched. In addition, each of the conductive lines of the conductive line array 310 is measured a plurality of times to identify whether a finger touch occurs. For example, in the first round of measurement, the two conductive lines $L_1$ and $L_{11}$ are coupled to two input terminals of the same differential amplifier 651 to determine whether the conductive line $L_1$ is touched. If the measuring value D associated with the conductive line $L_1$ is greater than 0, it indicates that a finger touch probably occurs at the conductive line $L_1$. Then, the two conductive lines $L_2$ and $L_{12}$ are coupled to two input terminals of the same differential amplifier 651 to determine whether the conductive line $L_2$ is touched. If the measuring value D associated with the conductive line $L_2$ is equal to 0, it indicates that a finger touch does not occur. The other conductive lines are sequentially measured in the same manner. Next, in the second round of measurement, the two conductive lines $L_1$ and $L_{21}$ are coupled to two input terminals of the same differential amplifier 651 to determine whether the conductive line $L_1$ is touched. If the measuring value D associated with the conductive line $L_1$ is greater than 0, it indicates that a finger touch probably occurs. Then, the other conductive lines are sequentially measured in the same manner. Here, with respect to detecting a specified conductive line (e.g., $L_1$), the circuit configuration in the first round of measurement (i.e., $L_1$ and $L_{11}$ are coupled to the same differential amplifier) is different from that in the second round of measurement (i.e., $L_1$ and $L_{21}$) to ensure whether the conductive line $L_1$ is touched. Accordingly, it is called "logical rearrangement of the conductive lines."

It should be noted that, in the third embodiment of FIG. 8A, the differential amplifier 651 generates a DC voltage signal in the absence of a finger touch or with a finger simultaneously placed on two conductive lines coupled to two input terminals of the same differential amplifier. As discussed in FIG. 4B, the signal extracting unit 352 performs signal extraction (i.e., summing the products of the corresponding voltage levels of the sensing signal C and the driving signal A) by using the driving signal A to obtain a measuring value D of 0 because the contributions from positive and negative terms cancel out. By comparison, with a finger placed on one of the two conductive lines coupled to two input terminals of the same differential amplifier, the sensing signal C generated by the differential amplifier 651 has the same period as the driving signal A, indicating the two signals A and C have the same sequence. After performing signal extraction on the sensing signal C, the signal extracting unit 352 obtains a measuring value greater than 0 since the positive and negative terms do not cancel each other out. Therefore, the third embodiment is different from the first and the second embodiments. That is, when no finger touches the conductive line array 310 or a finger simultaneously touches two conductive lines coupled to two input terminals of the same differential amplifier, the measuring value D becomes less (equal to 0). By contrast, when a finger is placed on one of the two conductive lines coupled to two input terminals of the same differential amplifier, the measuring value D becomes greater (greater than 0).

Figure 9A:
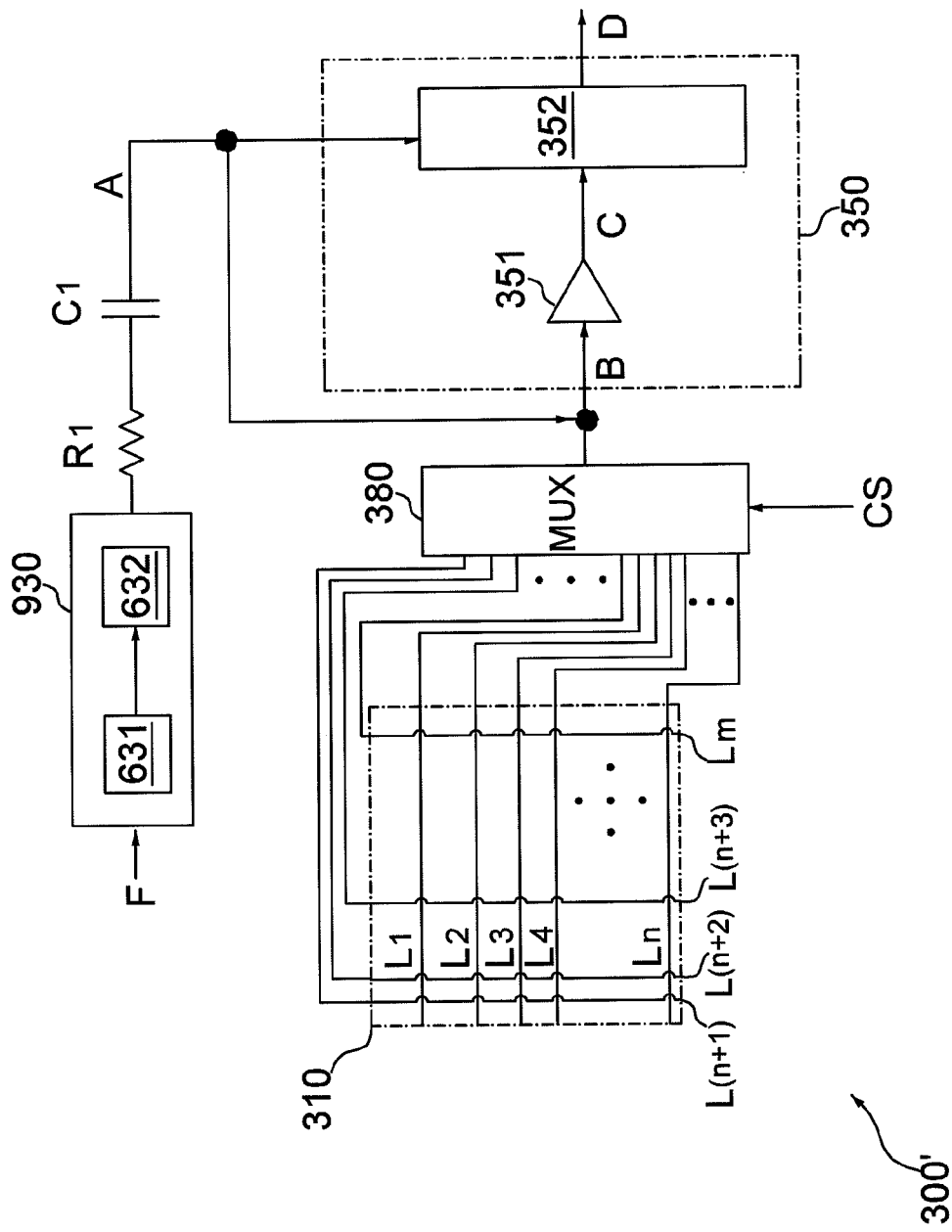
FIG. 9A is a block diagram of a touch detecting device according to a fourth embodiment of the invention.

FIG. 9A is a block diagram of a touch detecting device according to a fourth embodiment of the invention. In the first embodiment of FIG. 3A, the driving unit 330 and the buffer 351 are respectively coupled to two sides of the conductive line array 310 (hereinafter called "two-port connection") and the driving unit 330 is provided to perform the fixed-period sequence measurement. In the fourth embodiment of FIG. 9A, the output terminal of the driving unit 330 and the input terminal of the buffer 351 are coupled to the same side of the conductive line array 310 (hereinafter called "single-port connection"), convenient to be connected with known circuit configurations, such as LCD panels. In addition, the driving unit 930 is provided to selectively perform the fixed-period sequence measurement or the random-length sequence measurement. Here, the driving unit 930 includes a random number generator 631 and a random-length wave generator 632 and also receives an input fixed frequency F. Accordingly, the driving unit 930 selectively generates either a fixed-period driving signal A or a random-length driving signal A within each measurement time interval $t_m$ according to either the fixed frequency F or a random-length sequence generated by the random number generator 631.

Figure 9B:
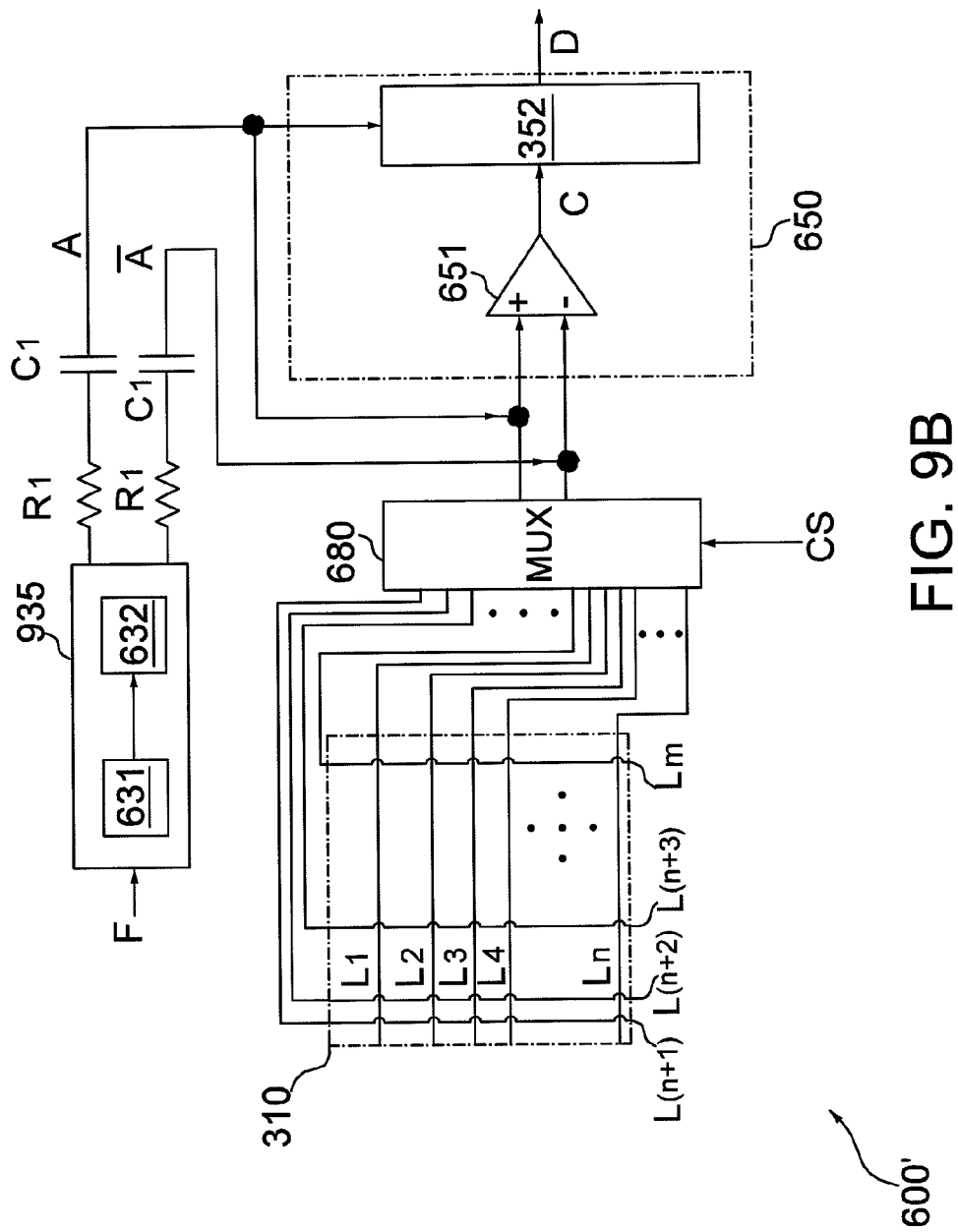
FIG. 9B is a block diagram of a touch detecting device according to a fifth embodiment of the invention.

FIG. 9B is a block diagram of a touch detecting device according to a fifth embodiment of the invention. Referring to FIGS. 6A and 9B, the touch detecting device 600 having a two-port connection configuration uses the driving unit 630 to perform random-length sequence measurement while the touch detecting device 600' having a single-port connection configuration uses the driving unit 935 to selectively perform the fixed-period sequence measurement or the random-length sequence measurement. Here, the driving unit 935 includes a random number generator 631 and a random-length wave generator 632 and also receives an input fixed frequency F. Accordingly, the driving unit 935 selectively generates either two complementary random-length driving signals A and $\overline{A}$ referenced to a common ground or two complementary fixed-length driving signals A and $\overline{A}$ referenced to a common ground within each measurement time interval $t_m$ according to the fixed frequency F or a random-length sequence generated by the random number generator 631.

Figure 9C:
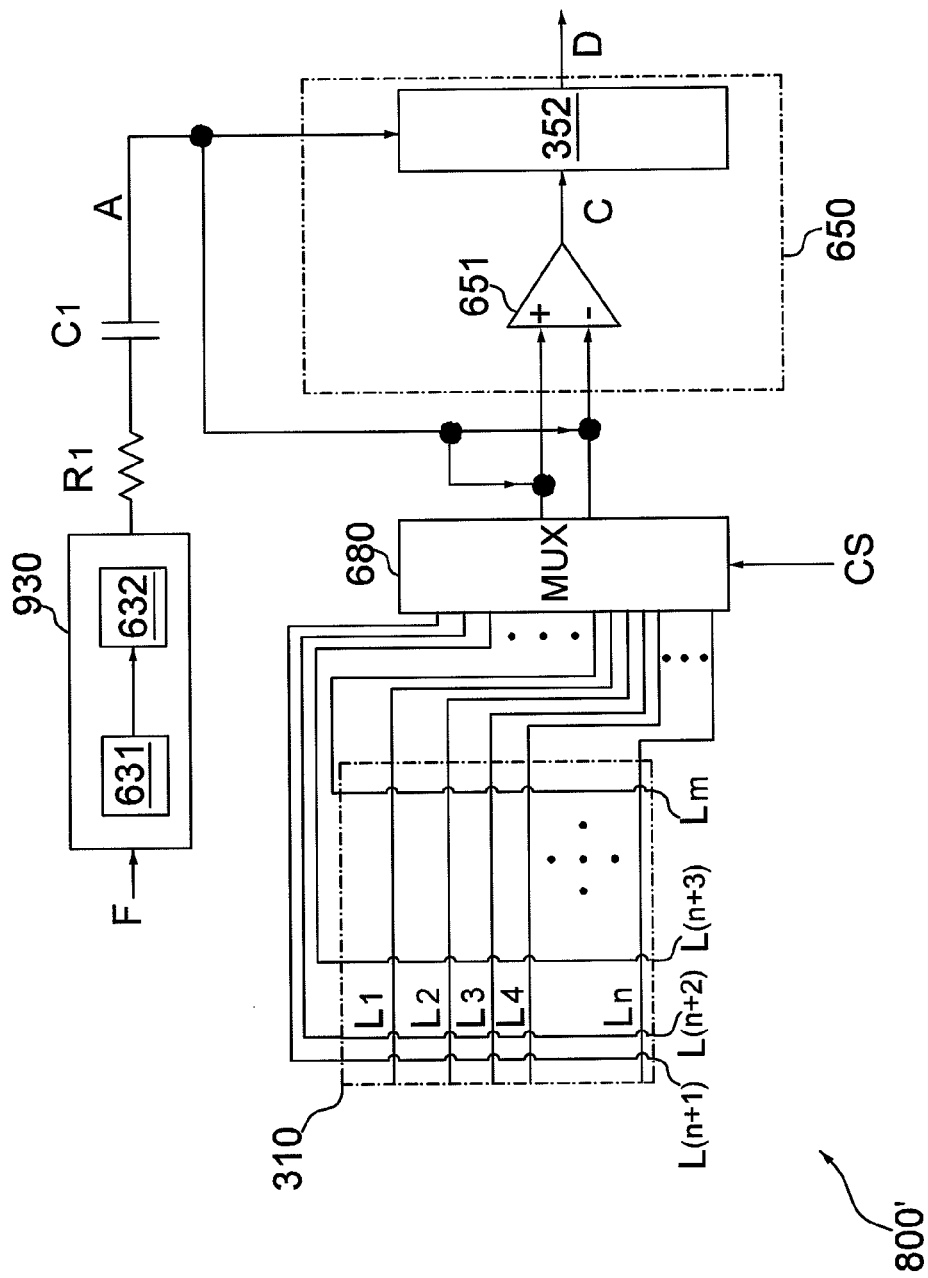
FIG. 9C is a block diagram of a touch detecting device according to a sixth embodiment of the invention.
Figure 9D:
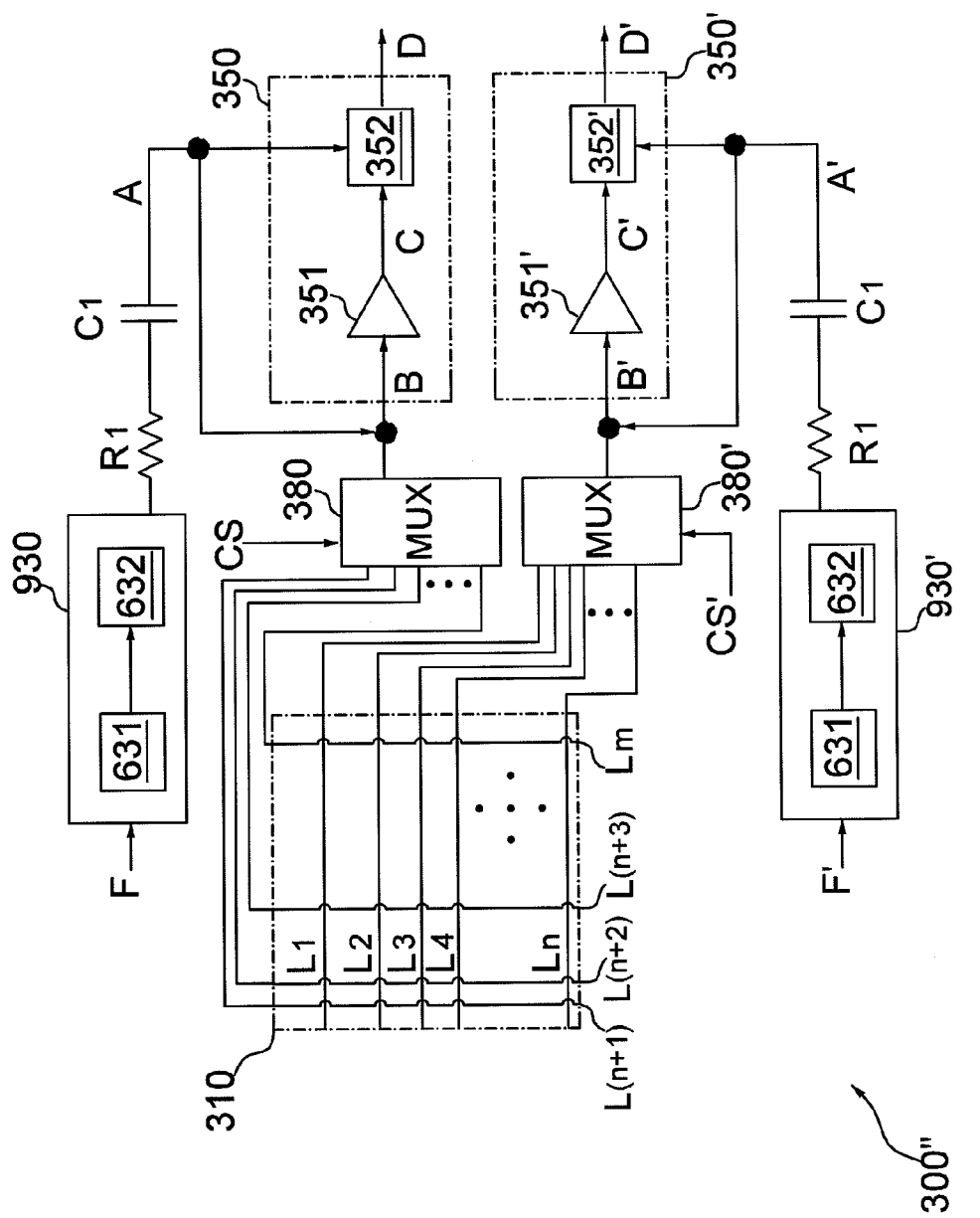
FIG. 9D is a block diagram of a touch detecting device according to a seventh embodiment of the invention.

FIG. 9C is a block diagram of a touch detecting device according to a sixth embodiment of the invention. Referring to FIGS. 8A and 9C, the touch detecting device 800 having a two-port connection configuration using the driving unit 830 to perform the random-length sequence measurement while a touch detecting device 800' having a single-port connection configuration uses the driving unit 930 to selectively perform the fixed-period sequence measurement or the random-length sequence measurement. FIG. 9D is a block diagram of a touch detecting device according to a seventh embodiment of the invention. In the fourth embodiment of FIG. 9A, all of the conductive lines shares a multiplexer 380, a driving unit 930 and a sensing circuit 350 for measurement. The hardware cost is reduced; however, it takes more time to complete the measurement of all the conductive lines. By contrast, in the seventh embodiment of FIG. 9D, two multiplexers 380 and 380', two driving units 930 and 930' and two sensing circuits 350 and 350' are provided for measurement. Although the hardware cost is slightly increased, the time to complete the measurement of all the conductive lines is reduced to one half.

It should be noted that, in the seventh embodiment, the driving units and the sensing circuits are configured in pairs. In other words, a driving unit and a sensing circuit form a measurement set. In one embodiment, a touch detecting device of the invention includes n measurement sets. With respect to the first measurement set, the demodulation sequence used by its sensing circuit is the same as the sequence (e.g., the driving signal A in FIG. 9D) generated by its driving unit. The demodulation sequence may be a fixed-period sequence or a random-length sequence. With respect to the second measurement set, the demodulation sequence used by its sensing circuit is the same as the sequence (e.g., the driving signal A' in FIG. 9D) generated by its driving unit. The demodulation sequence may be a fixed-period sequence or a random-length sequence. Likewise, with respect to the $n^{th}$ measurement set, the demodulation sequence used by its sensing circuit is the same as the sequence generated by its driving unit. The demodulation sequence may be a fixed-period sequence or a random-length sequence. Moreover, the measurement sets having the driving units and the sensing circuits configured in pairs are also adapted for the first, the second, the third, the fifth and the sixth embodiments (FIGS. 3A, 6A, 8A, 9B and 9C). Besides, the invention is not limited to the number of the driving units and the sensing circuits (or the number of the measurement sets). Depending on various implementations, the hardware cost is traded off for measurement efficiency.

The invention is still interfered by the noise having the same frequency as the driving signal A despite the fact that most noise can be eliminated. Besides, when the driving unit and the sensing circuit make measurement, the longer the measurement time interval $t_m$, the narrower the noise bandwidth becomes. Take periodic waves, for example—its noise bandwidth is $(1/t_m)$. Assuming that the touch signal S is modulated with a periodic wave (the driving signal) having a frequency of 200 KHz and each measurement time interval $t_m$ is equal to 30 μs, its noise bandwidth is $(1/(30 μs))\cong 30$ KHz and thus a frequency range of (200 KHz±30 KHz) is subject to noise interference. If each measurement time interval $t_m$ is equal to 10 μs, its noise bandwidth is $(1/(10 μs))\cong 100$ KHz and thus a frequency range of (200 KHz±100 KHz) is subject to noise interference. As can be observed from above, the longer the measurement time interval $t_m$, the narrower the noise bandwidth becomes. However, it takes more time to complete the whole measurement. Depending on the hardware cost, the signal-to-noise (SNR) value is traded off for the measurement time interval $t_m$. On the other hand, the invention provides both of the fixed-period sequence measurement and the random-length sequence measurement. While performing the fixed-period sequence measurement, the touch detecting device of the invention is subject to fixed frequency band noise interference. If a scanning circuit is provided to scan throughout all frequency bands to obtain a frequency band containing less noise prior to making the fixed-period sequence measurement, the fixed-period sequence measurement will outdo the random-length sequence measurement. The random-length sequence measurement has an advantage of being immune to the fixed frequency band noise interference, equivalent to distributing modulated signals among the frequency bands to minimize the risk of fixed frequency band noise attack. However, in order to produce a greater effect of random numbers, it needs to take longer time to averagely eliminate noise of various frequencies. Depending on the SNR value or the measurement time interval $t_m$, the fixed-period sequence measurement or the random-length sequence measurement can be selected. Optionally, a combination of the fixed-period sequence measurement and the random-length sequence measurement may be performed. For example, the fixed-period sequence measurement is performed for the current round of measurement while the random-length sequence measurement is performed for the next round of measurement, thus achieving a balancing effect. Surely, the driving unit has to be capable of generating a fixed-period sequence and a random-length sequence.

Figure 10A:
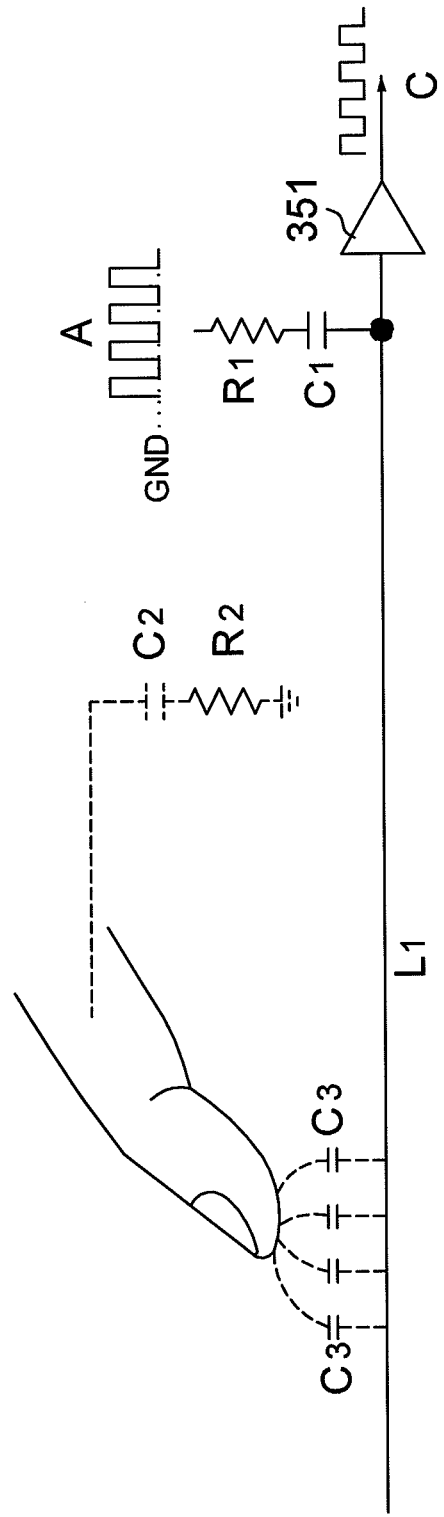
FIG. 10A shows an equivalent circuit when a user's finger is within a short distance from the conductive line $L_1$ according to the fourth embodiment (performing the fixed-period sequence measurement) of FIG. 9A.

It should be noted that, in the above embodiments, the user's finger does not need to actually touch the conductive lines (touching the conductive lines actually is hereinafter called"a direct finger touch"). A finger touch can be detected even though there is a short distance between the user's finger and the conductive lines or the user's finger hovers above the conductive lines (hereinafter called"a finger hovering touch"). FIG. 10A shows an equivalent circuit when a user's finger is within a short distance from the conductive line $L_1$ according to the fourth embodiment (performing the fixed-period sequence measurement) of FIG. 9A. Referring to FIG. 10A, a leakage current path to ground is created by the capacitive coupling between the finger and the conductive line $L_1$. Hence, despite a protective material (e.g., glass) is usually configured to isolate the conductive lines in LCD from the finger, the finger touch can be correctly detected. By comparison, the prior art detects a finger touch by means of measuring the variations in external capacitance in cross section of two perpendicular conductors and therefore needs additional capacitor manufacturing process. The invention uses the capacitive coupling between the finger and the conductive line $L_1$ to create a leakage current path to ground and detects a finger touch by measuring a voltage division (of the resistor $R_2$) when a user's finger hovers above the conductive lines. In other words, the invention makes good use of the innate characteristic of the human body to save the hardware cost without measuring the external capacitance affected by capacitors; thus, no additional capacitor manufacturing process is required.

Figure 10B:
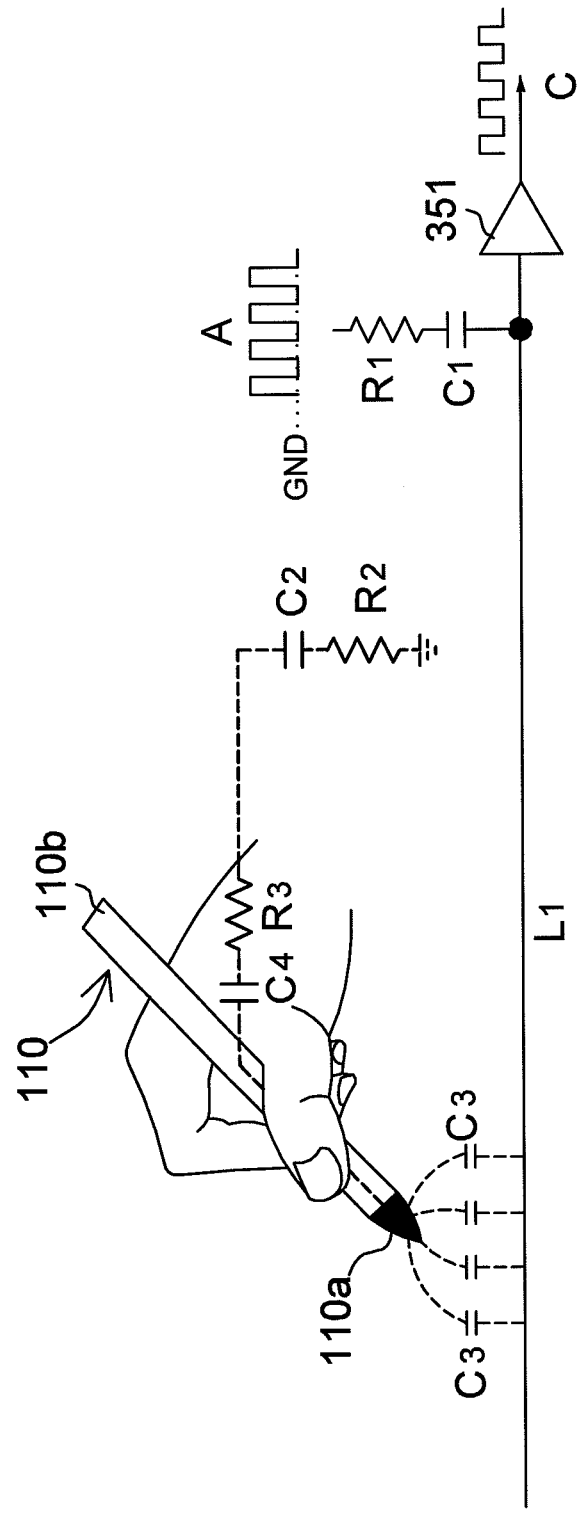
FIG. 10B shows an equivalent circuit when a stylus in a user's hand is within a short distance from the conductive line $L_1$ according to the fourth embodiment of FIG. 9A (performing the fixed-period sequence measurement).

FIG. 10B shows an equivalent circuit when a stylus held in a user's hand is within a short distance from the conductive line $L_1$ (hereinafter called"a stylus hovering touch") according to the fourth embodiment of FIG. 9A (performing the fixed-period sequence measurement). As can be observed from FIG. 10B, the invention is not only adapted for finger touches, but for stylus multi-touch. Here, the term "stylus multi-touch" includes a direct stylus touch and a stylus hovering touch, where the term"a direct stylus touch" refers to a stylus actually placed on the conductive lines. The limitations on the structure and the material of the stylus 110 in FIG. 10B are described as follows. Its tip 110a is made of capacitive materials (equivalent to capacitor $C_3$), achieving the purpose of forming a capacitive coupling between the tip 110a and the conductive line $L_1$ to electrically connect the tip 110a with the conductive line $L_1$. Its body 110b is made of conductive materials (equivalent to capacitor $C_4$), achieving the purpose of electrically connecting the capacitive material (the tip 110a) with the user's hand. The conductive materials may be the capacitive material of the tip 110a or a general metallic material. Then, a grounding loop is formed through the equipotential between the human body and the ground. Thus, a first grounding loop (FIG. 10B) from the conductive line $L_1$, along the stylus 110 indirectly through the human body to ground is equivalent to a second grounding loop (FIG. 10A) that is created when a user's finger hovers above the conductive lines $L_1$.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A touch detecting device for a touch panel, comprising:
    a driving unit for generating a driving signal according to a specified sequence;
    a sensing array, the sensing array comprising a plurality of conductive lines, the conductive lines sequentially receiving the driving signal and generating an output signal, wherein the plurality of conductive lines are arranged to form a specified two-dimension coordinate system; and
    a sensing circuit for receiving the output signal and performing signal extraction operations in accordance with the driving signal to generate a measuring value;
    wherein the amplitude of the output signal and the magnitude of the measuring value are related to whether a user touch is present on the sensing array; and
    wherein each of at least one touched conductive line permits a leakage current flowing from at least one of the plurality of conductive lines through the user's body to ground when the user touch is present on the sensing array.

2. The device according to claim 1, wherein the driving unit generates a fixed-period driving signal within a fixed measurement time interval after generating a fixed-period sequence according to an input fixed frequency.

3. The device according to claim 1, wherein the driving unit comprises:
   a random number generator for generating a random-length sequence within a fixed measurement time interval; and
   a random-length wave generator for generating a random-length driving signal according to the random-length sequence.

4. The device according to claim 1, wherein the driving unit selectively uses a fixed-period sequence or a random-length sequence to generate the driving signal, and wherein the driving signal is one of a fixed-period driving signal and a random-length driving signal.

5. The device according to claim 1, wherein the output terminal of the driving unit and the input terminal of the sensing circuit are respectively coupled to two different terminals of the plurality of conductive lines.

6. The device according to claim 1, wherein the output terminal of the driving unit and the input terminal of the sensing circuit are coupled to the same terminal of the plurality of conductive lines.

7. The device according to claim 1, wherein the sensing circuit comprises:
   a buffer for receiving the output signal and generating a sensing signal; and
   a signal extracting unit for receiving the sensing signal and performing demodulation operations according to the driving signal to generate the measuring value.

8. The device according to claim 1, wherein the sensing circuit comprises:
   a differential amplifier, two input terminals of the differential amplifier being coupled with two of the conductive lines, the differential amplifier eliminating low-frequency noise and generating a sensing signal; and
   a signal extracting unit for receiving the sensing signal and performing demodulation operations according to the driving signal to generate the measuring value.

9. The device according to claim 8, wherein the touch panel further comprises a stylus, wherein the two input terminals of the differential amplifier are coupled with the two of the conductive lines that receive the same driving signal, and wherein a distance between the two of the conductive lines is greater than a width of the stylus.

10. The device according to claim 8, wherein the two input terminals of the differential amplifier are coupled with two of the conductive lines that receive a differential driving signal referenced to a common ground.

11. The device according to claim 1, wherein the user touch is selected from the group comprising a direct finger touch, a finger hovering touch, a direct stylus touch, a stylus hovering touch and a combination thereof.

12. The device according to claim 11, wherein the direct stylus touch and the stylus hovering touch is related with a stylus, wherein the tip of the stylus is made of a capacitive material and the body of the stylus is made of a conductive material, and wherein the conductive material is one of the capacitive material and a metallic material.

13. A touch detecting device for a touch panel, comprising:
   a wave generator for generating in parallel a plurality of wave signals according to a specified frequency;
   a sensing array, the sensing array comprising a plurality of conductive lines, wherein the plurality of conductive lines are arranged to form a specified two-dimension coordinate system and the plurality of conductive lines receive in parallel the plurality of wave signals to generate a plurality of modulated signals;
   a demodulation unit for receiving in parallel the plurality of modulated signals and performing demodulation according to their the corresponding wave signals to generate a plurality of touch signals; and
   a calculating unit for receiving in parallel the plurality of touch signals and generating a plurality of measuring values;
   wherein the amplitudes of the plurality of modulated signals, the amplitudes of the plurality of touch signals and the magnitudes of the plurality of measuring values are related to whether a user touch is present on the sensing array; and
   wherein each of at least one touched conductive line permits a leakage current flowing from at least one of the plurality of conductive lines through the user's body to ground when the user touch is present on the sensing array.

14. The device according to claim 13, wherein, when the specified frequency is fixed, the wave generator generates in parallel a plurality of fixed-period wave signals within a fixed measurement time interval.

15. The device according to claim 13, wherein, when the specified frequency comprises a plurality of random frequency components, the wave generator generates in parallel a plurality of random-length wave signals within a fixed measurement time interval.

16. The device according to claim 13, wherein the wave generator selectively uses a fixed frequency or a plurality of random frequency components to generate in parallel the plurality of wave signals, and wherein each wave signal is one of a fixed-period wave signal and a random-length wave signal.

17. The device according to claim 13, wherein the output terminal of the wave generator and the input terminal of the demodulation unit are respectively coupled to two different terminals of the sensing array.

18. The device according to claim 13, wherein the output terminal of the wave generator and the input terminal of the demodulation unit are respectively coupled to the same terminal of the sensing array.

19. The device according to claim 13, wherein the demodulation unit comprises a plurality of buffers coupled with the sensing array.

20. The device according to claim 13, wherein the demodulation unit comprises a plurality of differential amplifiers coupled with the sensing array for eliminating low-frequency noise.

21. The device according to claim 20, wherein the touch panel further comprises a stylus, wherein the two input terminals of each differential amplifier are coupled with two of the plurality of conductive lines that receive the same wave signal, and wherein a distance between the two of the conductive lines is greater than a width of the stylus.

22. The device according to claim 20, wherein the two input terminals of each differential amplifier are coupled with two of the plurality of conductive lines that receive a differential wave signal referenced to a common ground.

23. The device according to claim 13, wherein the user touch is selected from the group comprising a direct finger touch, a finger hovering touch, a direct stylus touch, a stylus hovering touch and a combination thereof.

24. The device according to claim 23, wherein the direct stylus touch and the stylus hovering touch is related with a stylus, wherein the tip of the stylus is made of a capacitive material and the body of the stylus is made of a conductive material, and wherein the conductive material is one of the capacitive material and a metallic material.

25. A touch detecting method for a touch panel, comprising:
  according to a specified frequency, obtaining a driving signal;
  providing a sensing array, the sensing array comprising a plurality of conductive lines, wherein the plurality of conductive lines are arranged to form a specified two-dimension coordinate system;
  receiving sequentially the driving signal by the plurality of conductive lines to generate an output signal; and
  according to the driving signal, performing signal demodulation operations on the output signal to obtain a measuring value;
  wherein the amplitude of the output signal and the magnitude of the measuring value are related to whether a user touch is present on the sensing array; and
  wherein each of at least one touched conductive line permits a leakage current flowing from at least one of the plurality of conductive lines through the user's body to ground when the user touch is present on the sensing array.

26. The method according to claim 25, wherein, when the specified frequency is fixed, the driving signal is a fixed-period driving signal.

27. The method according to claim 25, wherein, when the specified frequency comprises a plurality of random frequency components, the driving signal is a random-length driving signal.

28. The method according to claim 25, wherein the step of obtaining the driving signal comprises:
  selectively using a fixed frequency or a plurality of random frequency components to generate the driving signal, and
  wherein the driving signal is one of a fixed-period driving signal and a random-length driving signal.

29. The method according to claim 25, wherein the step of performing the signal demodulation operations comprises:
  providing a buffer;
  coupling the buffer with a conductive line of the sensing array;
  receiving the output signal by the buffer to generate a sensing signal; and
  performing the signal demodulation operations on the sensing signal according to the driving signal to obtain the measuring value.

30. The method according to claim 25, wherein the step of performing the signal demodulation operations comprises:
  providing a differential amplifier for eliminating low-frequency noise;
  coupling two input terminals of the differential amplifier with two of the conductive lines that receive the same driving signal to generate a sensing signal; and
  performing the signal demodulation operations on the sensing signal according to the driving signal to obtain the measuring value;
  wherein a distance between the two of the conductive lines coupled to the two input terminals of the differential amplifier is greater than a width of a stylus; and
  wherein the touch panel further comprises the stylus.

31. The method according to claim 25, wherein the step of performing the signal demodulation operations comprises:
  providing a differential amplifier for eliminating low-frequency noise;
  coupling two input terminals of the differential amplifier with two of the conductive lines that receive a differential driving signal referenced to a common ground to generate a sensing signal; and
  performing the signal demodulation operations on the sensing signal according to the driving signal to obtain the measuring value.

32. The method according to claim 25, wherein the user touch is selected from the group comprising a direct finger touch, a finger hovering touch, a direct stylus touch, a stylus hovering touch and a combination thereof.

33. The method according to claim 32, wherein the direct stylus touch and the stylus hovering touch is related with a stylus, wherein the tip of the stylus is made of a capacitive material and the body of the stylus is made of a conductive material, and wherein the conductive material is one of the capacitive material and a metallic material.

* * * * *